US008885183B2

(12) United States Patent
Fujii et al.

(10) Patent No.: US 8,885,183 B2
(45) Date of Patent: Nov. 11, 2014

(54) IMAGE FORMING SYSTEM WITH AN AIR CLEANER THAT DISPLAYS AN OPERATING STATE OF THE IMAGE FORMING APPARATUS

(75) Inventors: Shuhji Fujii, Osaka (JP); Kouji Miyake, Osaka (JP); Takateru Yamamoto, Osaka (JP); Takeshi Nakamura, Osaka (JP)

(73) Assignee: Sharp Kabushiki Kaisha, Osaka-Shi (JP)

( * ) Notice: Subject to any disclaimer, the term of this patent is extended or adjusted under 35 U.S.C. 154(b) by 964 days.

(21) Appl. No.: 12/834,359

(22) Filed: Jul. 12, 2010

(65) Prior Publication Data

US 2011/0019217 A1 Jan. 27, 2011

(30) Foreign Application Priority Data

Jul. 22, 2009 (JP) ................................ 2009-171333
Jul. 23, 2009 (JP) ................................ 2009-172467

(51) Int. Cl.
*G06F 3/12* (2006.01)
*G03G 21/20* (2006.01)
*G03G 15/00* (2006.01)

(52) U.S. Cl.
CPC .......... *G03G 15/5016* (2013.01); *G03G 21/206* (2013.01); *G03G 15/5004* (2013.01)
USPC ................ 358/1.13; 399/88; 399/91; 399/92; 399/98

(58) Field of Classification Search
USPC ........................................................ 358/1.13
See application file for complete search history.

(56) References Cited

U.S. PATENT DOCUMENTS

| | | | | |
|---|---|---|---|---|
| 2002/0105674 | A1* | 8/2002 | Nomura et al. | 358/1.15 |
| 2003/0072675 | A1 | 4/2003 | Takeda et al. | |
| 2005/0111062 | A1* | 5/2005 | Fukui et al. | 358/514 |
| 2005/0180772 | A1* | 8/2005 | Dergham et al. | 399/92 |
| 2007/0071190 | A1 | 3/2007 | Depo | |
| 2008/0074824 | A1* | 3/2008 | Furuhashi et al. | 361/231 |
| 2010/0071397 | A1 | 3/2010 | Takeda et al. | |
| 2011/0134474 | A1* | 6/2011 | Yamada et al. | 358/1.15 |

FOREIGN PATENT DOCUMENTS

| | | | |
|---|---|---|---|
| CN | 201248078 | Y | 5/2009 |
| JP | 2300770 | A2 | 12/1990 |
| JP | 2001-154606 | A | 6/2001 |
| JP | 2002-058731 | | 2/2002 |
| JP | 2002039627 | A2 | 2/2002 |
| JP | 2004-105302 | | 4/2004 |
| JP | 2005-004144 | A | 1/2005 |
| JP | 2006-343491 | A | 12/2006 |
| JP | 2007-047496 | A | 2/2007 |
| JP | 2008-112064 | A | 5/2008 |

* cited by examiner

*Primary Examiner* — Benjamin O Dulaney
(74) *Attorney, Agent, or Firm* — Nixon & Vanderhye P.C.

(57) ABSTRACT

An image forming system according to an embodiment of the present invention includes an air cleaner for cleaning air, an image forming apparatus that is settable to a mode for economizing power, and a control unit that causes a display unit of the air cleaner to display an operating state of the image forming apparatus when the image forming apparatus is set to the mode for economizing power.

An image forming system according to another embodiment of the present invention includes an image forming apparatus that prints an image on recording paper, an air cleaner that is for cleaning air, and is integrally attached to the image forming apparatus via a support member, and supported above the image forming apparatus by the support member, and a control unit that causes a display unit of the air cleaner to display an operating state of the image forming apparatus.

8 Claims, 10 Drawing Sheets

FIG.6B

| Input type | Name | Input value/Key name | Display method | Description |
|---|---|---|---|---|
| Checkbox 172 | Operation of air cleaner when power key of image forming apparatus is turned on | Coordinate turning on<br>Default: Checked | Always selectable | Used when operation of air cleaner is turned on in coordination with power key of image forming apparatus |
| Selection box 174 | | 1 Air volume: Low<br>2 Air volume: High<br>Default: "Air volume: Low" | Gray out display when "Coordinate turning on" checkbox is not checked | Default air volume is set when operation of air cleaner is turned on in coordination with power key of image forming apparatus |

FIG.6C

| Input type | Name | Input value/Key name | Display method | Description |
|---|---|---|---|---|
| Checkbox 173 | Operation of air cleaner when power key of image forming apparatus is turned off | Coordinate turning off<br>Default: Checked | Always selectable | Used when operation of air cleaner is turned off in coordination with power key of image forming apparatus |
| Selection box 175 | | 1 Turn off immediately<br>2 Turn off with timer<br>Default: "Turn off immediately | Gray out display when "Coordinate turning off" checkbox is not checked | Set whether to turn off immediately or turn off with timer when operation of air cleaner is turned off in coordination with power key of image forming apparatus |
| Input box 176 | | Input numerical value between 1 to 240 minutes<br>Default: 120 minutes | Display active only when "Turn off with timer" is selected | Timer is set to show how many minutes until operation of air cleaner is turned off after power key of image forming apparatus is turned off when "Turn off with timer" is selected. If numerical value other than 1 to 240 is input, error message is displayed when OK key is pressed. |

FIG.8

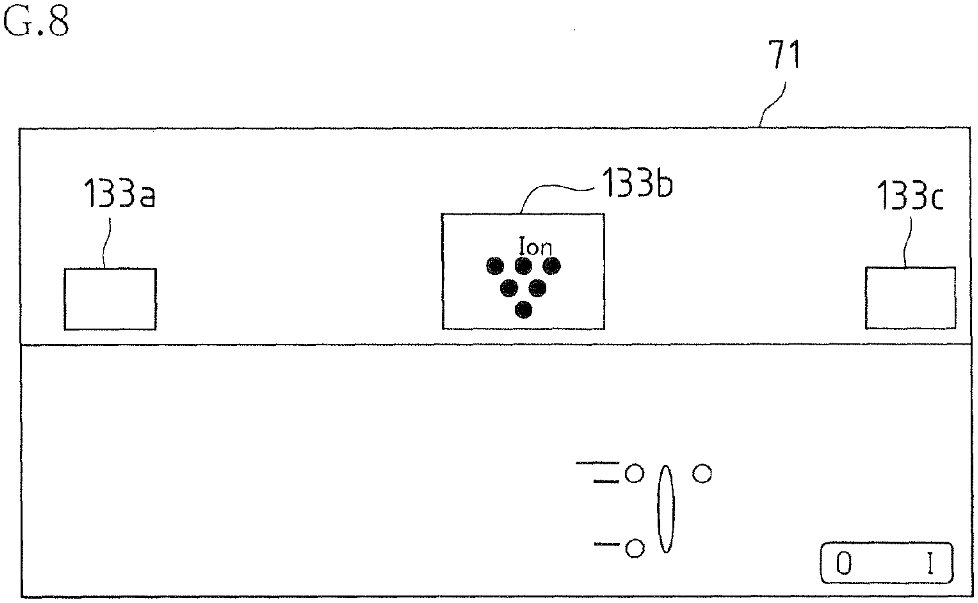

FIG.9

| | LED133a | LED133b | LED133c |
|---|---|---|---|
| Image forming apparatus fails | | | Flash |
| Air cleaner fails | | Flash | |
| Paper jam in image forming apparatus | | | Illuminate |
| Image forming apparatus needs maintenance | | | Illuminate |
| Air cleaner operating | | Illuminate | |
| Air cleaner needs maintenance | | Flash | |
| Receiving FAX | Flash | | |
| Complete FAX output | Illuminate | | |
| Performing print processing | Flash | | |
| Complete print processing | Illuminate | | |

FIG.10

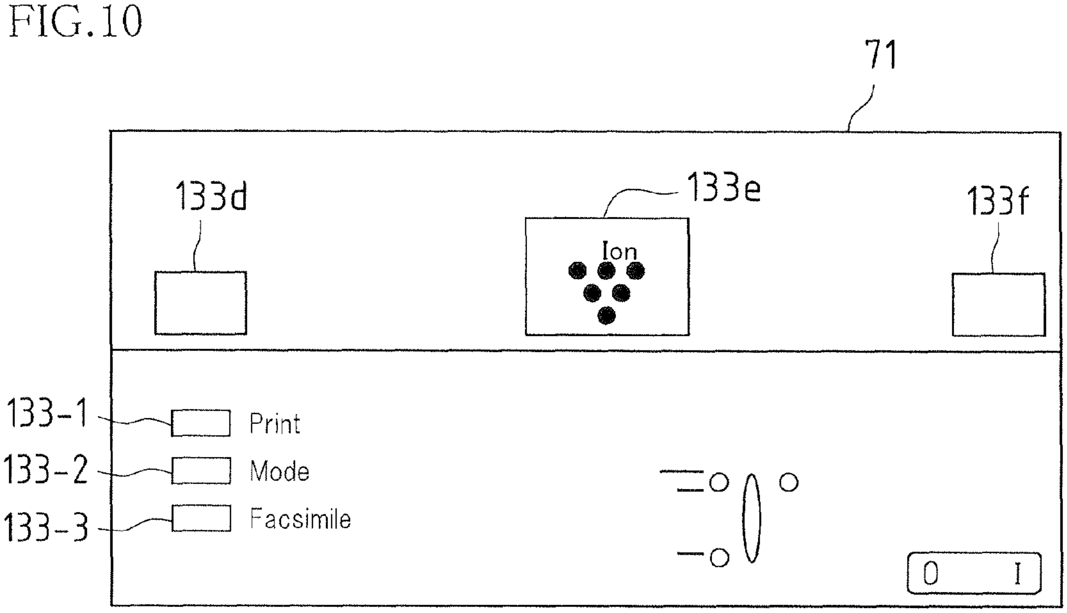

FIG.11

| | LED133d | LED133e | LED133f | LED133-1 | LED133-2 | LED133-3 |
|---|---|---|---|---|---|---|
| Toner near end etc. in image forming apparatus | | | Flash | | | |
| Air cleaner fails | | Flash | | | | |
| Paper jam in image forming apparatus | | | Illuminate | | | |
| Toner end etc. in image forming apparatus | | | Illuminate | | | |
| Air cleaner operating | | Illuminate | | | | |
| Air cleaner needs maintenance | | Flash | | | | |
| Printing execution state | Illuminate | | | Illuminate | | |
| Scanner execution state | Flash | | | Illuminate | | |
| State of standby mode or power saving mode | Illuminate | | | | Illuminate | |
| State of print processing mode | Flash | | | | Illuminate | |
| Waiting for receiving facsimile | Illuminate | | | | | Illuminate |
| Start receiving facsimile | Flash | | | | | Illuminate |

IMAGE FORMING SYSTEM WITH AN AIR CLEANER THAT DISPLAYS AN OPERATING STATE OF THE IMAGE FORMING APPARATUS

CROSS-REFERENCE TO RELATED APPLICATION

This application claims priority under 35 U.S.C. §119(a) on Patent Application No. 2009-171333 filed in Japan on Jul. 22, 2009 and Patent Application No. 2009-172467 filed in Japan on Jul. 23, 2009, the entire contents of which are herein incorporated by reference.

BACKGROUND OF THE INVENTION

1. Field of the Invention

The present invention relates to an image forming system that includes an image forming apparatus such as a copier, a printer, or a facsimile machine, and an air cleaner.

2. Description of Related Art

Electrophotographic apparatuses are an example of this type of image forming apparatus. In electrophotographic apparatuses, a toner image is formed on the surface of a photosensitive drum by forming an electrostatic latent image on the surface of the photosensitive drum, and developing the electrostatic latent image on the surface of the photosensitive drum using toner, and the toner image is fixed onto recording paper by transferring the toner image from the photosensitive drum to the recording paper, and applying heat and pressure to the recording paper.

Such image forming apparatuses are essential office automation equipment, and are installed in most offices, and moreover they are also becoming widespread in homes and hospitals.

Various proposals have been made with respect to image forming apparatuses in order to simplify time consuming operations performed by a user who manages the apparatuses, and suppress an increase in power consumption.

For example, with the technique disclosed in JP 2000-47536A, a master image forming apparatus and a slave image forming apparatus are connected to each other, and assuming that a connected copying function is provided with which when an original is copied by the master apparatus, communication is performed to transmit this original to the slave apparatus, and thereby the same original is copied by the master and slave apparatuses, even if the slave apparatus is in the power off state due to a weekly timer function, the power of the slave apparatus is turned on by disabling the weekly timer function of the slave apparatus when executing the connected copying function. Accordingly, the connected copying function can be executed at any time, without particularly operating the power of the slave apparatus.

Further, with the technique disclosed in JP 2001-117415A, setting is performed so as to switch between a preheating mode for lowering a fixing temperature of a fixing apparatus of an image forming apparatus and a night mode for turning off the heater power of the fixing apparatus, and the heater power of the fixing apparatus is automatically turned off when a transition is made from the preheating mode to the night mode. Thereby, an increase in power consumption can be suppressed.

There has been more cases where air cleaners for purifying the air in the room are installed in offices, homes, hospitals, and the like.

For example, JP 2002-58731A discloses an ion generating apparatus that simultaneously generates positive and negative ions, and the positive and negative ions effectively eliminate airborne bacteria in the air.

However, if an air cleaner is installed in addition to an image forming apparatus, individual space and cost for installing these are necessary, and the user who manages these will have to additionally perform time-consuming operations.

SUMMARY OF THE INVENTION

In view of this, an object of the present invention is to provide an image forming system that includes an image forming apparatus and an air cleaner.

An image forming system of the present invention includes an air cleaner for cleaning air, an image forming apparatus that is settable to a mode for economizing power, and a control unit that causes a display unit of the air cleaner to display an operating state of the image forming apparatus when the image forming apparatus is set to the mode for economizing power.

Conventionally, an image forming apparatus is settable to, for example, a warm-up mode for setting a fixing temperature, a print processing mode for performing print processing, a standby mode for reducing power consumption when print processing is not performed, a power saving mode for further reducing power consumption, a night mode for still further reducing power consumption, or the like. The standby mode, the power saving mode, and the night mode are modes for economizing power.

With such an image forming apparatus, even if a mode for economizing power is set, when trouble such as failure of the image forming apparatus has occurred, it is necessary to report this immediately.

Similarly, with an air cleaner, when trouble such as failure of the air cleaner has occurred, it is necessary to report this immediately.

Therefore, in both the image forming apparatus and the air cleaner, it is desirable to allow respective display units to remain operating all the time, and thus power consumption for the operation of these display units is necessary. However, in the image forming apparatus, if the display unit is allowed to remain operating all the time, even if a mode for economizing power is set, power consumption of the display unit cannot be reduced.

In view of this, in the image forming system of the present invention, as described above, the display unit of the air cleaner is caused to display the operating state of the image forming apparatus when the image forming apparatus is set to a mode for economizing power. Accordingly, when the image forming apparatus is set to a mode for economizing power, it is not necessary to allow the display unit of the image forming apparatus to remain operating, and thus power consumption of the display unit of this image forming apparatus can be reduced.

Further, when not only the operating state of the image forming apparatus, but also the operating state of the air cleaner is displayed by the display unit of the air cleaner, a user can recognize the operating states of both the image forming apparatus and the air cleaner only by looking at the display content of the display unit of the air cleaner, and thus it will be easy to manage both of the apparatuses.

Further, in the image forming system of the present invention, it is preferable to adopt a configuration in which even if the display unit of the air cleaner is caused to display the operating state of the image forming apparatus when the image forming apparatus is set to a mode for economizing power, functionality of the image forming apparatus is not impaired, and functionality of the air cleaner is not impaired either.

For example, in the image forming system of the present invention, the image forming apparatus may have a facsimile communication function, and when the image forming apparatus is performing facsimile communication in a state where the mode for economizing power is set, the control unit may cause the display unit of the air cleaner to display a state of the facsimile communication.

In the image forming system of the present invention, the air cleaner may include an ion generating portion.

As this ion generating portion, it is preferable to use an ion generating portion that simultaneously generates and emits positive and negative ions. Such positive and negative ions can effectively eliminate airborne bacteria in the air and can decompose and reduce exhaust gas of the image forming apparatus, and are therefore preferable in the present invention. For example, there are cases where an electrophotographic image forming apparatus produces exhaust gas such as ozone, and normally, elimination is performed with a filter provided in the image forming apparatus, and thereafter discharge is performed. However, positive and negative ions can decompose and reduce exhaust gas such as ozone by using the ion generating portion.

In the image forming system of the present invention, the air cleaner may be provided above the image forming apparatus.

In this case, space for installing the air cleaner can be saved. Further, the air blown from the air cleaner can be circulated over a wide area, and thus the air purification action can be increased.

Alternatively, in the image forming system of the present invention, the air cleaner may be built into the image forming apparatus. In this case, the space for installing the air cleaner can also be saved.

Another image forming system of the present invention includes an image forming apparatus that prints an image on recording paper, an air cleaner that is for cleaning air, and is integrally attached to the image forming apparatus via a support member, and supported above the image forming apparatus by the support member, and a control unit that causes a display unit of the air cleaner to display an operating state of the image forming apparatus.

Conventionally, if an air cleaner is installed in addition to an image forming apparatus, individual space and cost for installing these were necessary, and the user who manages these had to additionally perform time-consuming operations.

For example, with the image forming apparatus, when trouble is displayed on a display screen thereof, it is necessary to deal with this trouble. Further, the operation of the air cleaner is displayed on a display screen thereof, and it is necessary to check this display content. However, it is troublesome to go to just check the display content of the image forming apparatus and that of the air cleaner individually.

It is hard to visually recognize the display content of both the image forming apparatus and the air cleaner from a distance, and the display content cannot be viewed unless the user goes to the respective installation places.

With the image forming apparatus, an operation panel that is provided with a plurality of keys and the display screen is disposed facing upward, and thus display content of the display screen of this operation panel cannot be visually recognized from a distance. The reason for disposing the operation panel facing upward is to make it easy for the user who stands in front of the image forming apparatus to operate the keys of the operation panel, and visually recognize the display screen thereof.

Further, if the air cleaner is small and placed on the floor, desks, cabinets, OA equipment, and so on block the view in an office, and thus it is difficult to visually recognize the display screen of the air cleaner from a distance.

As described above, both the display screen of the conventional image forming apparatus and the display screen of the conventional air cleaner cannot be visually recognized from a distance, and thus it is troublesome to just check the operating states of the image forming apparatus and the air cleaner.

In view of this, in the other image forming system of the present invention, as described above, the air cleaner is supported above the image forming apparatus by the support member, and the control unit causes the display unit of the air cleaner to display the operating state of the image forming apparatus. Therefore, the state of the image forming apparatus will be displayed by the display unit of the air cleaner that is disposed above the image forming apparatus. Specifically, the display unit of the air cleaner is disposed at a high position, and the operating state of the image forming apparatus is displayed by this display unit. Since the display unit of the air cleaner that is disposed at a high position can be visually recognized even from a distance, the state of the image forming apparatus can be checked from a distance.

Further, since the air cleaner is disposed above the image forming apparatus, space for installing the air cleaner can be saved. Moreover, it becomes easy to circulate the air blown from the air cleaner over a wide area, and thus the air purification action can be increased.

In the other image forming system of the present invention, the display unit of the air cleaner may display the operating state of the image forming apparatus by selectively illuminating or flashing a plurality of light emitting elements.

It is easy to visually recognize the display using such illumination or flashing of the light emitting elements even from a distance. Further, various information can be displayed by selectively illuminating or flashing the plurality of light emitting elements.

Moreover, in the other image forming system of the present invention, the control unit may cause the display unit of the air cleaner to further display an operating state of the air cleaner.

With this configuration, since the display unit of the air cleaner is caused to display the operating state of the air cleaner as well, the operating state of the image forming apparatus and the operating state of the air cleaner can be reported at the same time, and thereby it will be possible to manage the operating states at the same time, thus reducing time consuming operations to be performed by the user.

In the other image forming system of the present invention, the air cleaner may include an ion generating portion.

As this ion generating portion, it is preferable to use an ion generating portion that simultaneously generates and emits positive and negative ions. Such positive and negative ions can effectively eliminate airborne bacteria in the air and can decompose and reduce exhaust gas of the image forming apparatus, and are therefore preferable in the present invention. Although there are cases where, for example, ozone is produced in the electrophotographic image forming apparatus, positive and negative ions can decompose and reduce exhaust gas such as ozone.

Moreover, in the other image forming system of the present invention, the control unit may cause the display unit of the air cleaner to display trouble that has occurred with the image forming apparatus as the operating state of the image forming apparatus.

For example, the control unit may cause the display unit of the air cleaner to display trouble such as failure of the image forming apparatus and a paper jam as the operating state of the image forming apparatus. In this case, the user can be informed of failure and a paper jam even from a distance. In other words, trouble is reported over a wider area.

In the other image forming system of the present invention, the image forming apparatus may have a plurality of types of functions, and when any of the functions is executed by the image forming apparatus, the control unit may cause the display unit of the air cleaner to display the function that is being executed as the operating state of the image forming apparatus.

For example, if the image forming apparatus is a multi-function peripheral, a copying function, a print function, a facsimile function, and the like are provided as the functions thereof. The state of the image forming apparatus can be checked even from a distance by the display unit of the air cleaner displaying a function that is being executed among these functions.

BRIEF DESCRIPTION OF THE DRAWINGS

FIG. 6B is a chart showing an operation name, descriptions of the operation, and the like corresponding to a checkbox and a selection box with regard to the operation of the air cleaner when a power key of the image forming apparatus is turned on, in the input setting screen shown in FIG. 6A.

FIG. 6C is a chart showing an operation name, descriptions of the operation, and the like corresponding to a checkbox, a selection box, and an input box with regard to the operation of the air cleaner when the power key of the image forming apparatus is turned off, in the input setting screen shown in FIG. 6A.

FIG. 8 is a plan view showing an example of the disposition of LEDs of a display unit of the air cleaner.

FIG. 9 is a chart showing respective report information corresponding to flashing or illumination of the LEDs shown in FIG. 8.

FIG. 10 is a plan view showing another example of the disposition of LEDs of the display unit of the air cleaner.

FIG. 11 is a chart showing respective report information corresponding to flashing or illumination of the LEDs shown in FIG. 10.

DESCRIPTION OF PREFERRED EMBODIMENTS

Hereinafter, embodiments of the present invention are described in detail with reference to the accompanying drawings.

Embodiment 1

Figure 1:
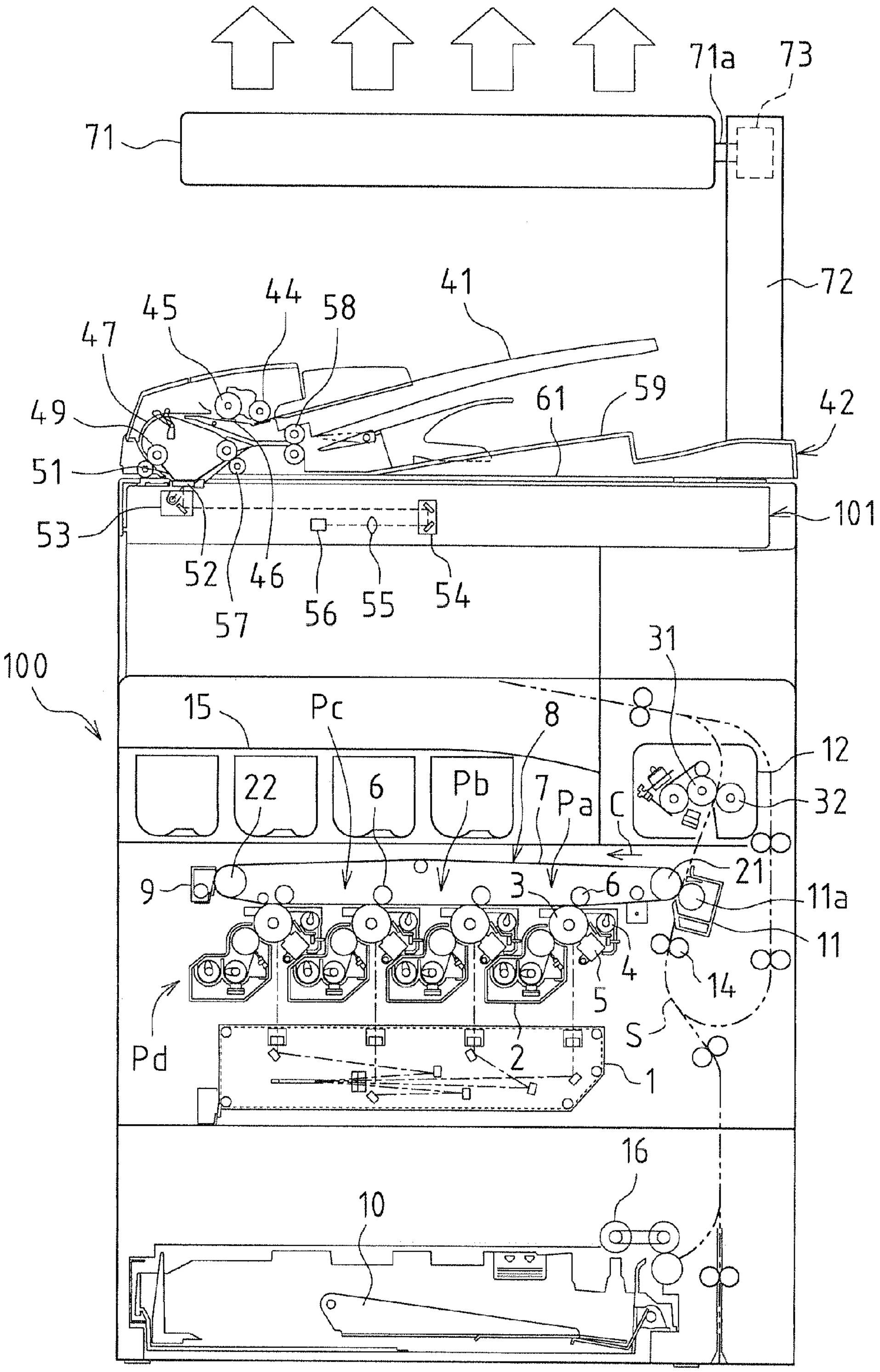
FIG. 1 is a cross-sectional view schematically showing an embodiment of an image forming system of the present invention.

FIG. 1 is a diagram schematically showing the configuration of an image forming system according to Embodiment 1 of the present invention. The image forming system according to Embodiment 1 of the present invention is provided with an image forming apparatus 100 and an air cleaner 71 that is disposed above the image forming apparatus 100. Note that a configuration in which an image forming apparatus is integrally provided with an air cleaner may be adopted as one image forming system.

The image forming apparatus 100 is a so-called multi-function peripheral that has a scanner function, a copying function, a printer function, a facsimile function, and the like, and can transmit an image of an original read by an original reading apparatus 101 to the outside (a scanner function), and can record and form an image of the original that has been read or an image received from the outside onto recording paper in color or monochrome (the copying function, the printer function, and the facsimile function).

The image forming apparatus 100 is provided with the original reading apparatus 101 and an original transport unit 42 to read an image of the original. The original reading apparatus 101 reads an image of the original that is being transported by the original transport unit 42. In the original transport unit 42, when an original is set on an original setting tray 41, an original pickup roller 44 rotates while pressing against the surface of the original, and the original is pulled out from the original setting tray 41 and passed between a separation roller 45 and a separation pad 46 so as to be separated sheet-by-sheet, and then transported to a transport path 47.

On the transport path 47, a leading edge of the original abuts against original registration rollers 49 and becomes aligned parallel to the original registration rollers 49, and thereafter the original is transported by the original registration rollers 49 and passes between a reading guide 51 and a reading glass 52. Further still, the original is transported by transport rollers 57, and discharged to a discharge tray 59 via discharge rollers 58.

In the original reading apparatus 101, when the original passes between the reading guide 51 and the reading glass 52, the surface of the original is irradiated with light from a light source of a first scanning unit 53 via the reading glass 52, and the light reflected therefrom enters the first scanning unit 53 through the reading glass 52, and this reflected light is reflected by mirrors of the first scanning unit 53 and a second scanning unit 54 to be guided to an image forming lens 55, and then the image of the original is formed on a CCD (charge coupled device) 56 by the image forming lens 55. The CCD 56 reads the image of the original, and outputs image data that indicates the image of the original.

It is also possible to read an original that is placed on an original glass platen 61. One far side of the original transport unit 42 is pivotably supported by a hinge (not shown) on one far side of the original reading apparatus 101 that is disposed beneath, and the original transport unit 42 can be opened and closed by the near portion thereof being raised or lowered. The original glass platen 61 is released by opening this original transport unit 42, and thus an original can be placed on the original glass platen 61. When an original is placed and the original transport unit 42 is closed, the surface of the original on the original glass platen 61 is exposed by the first scanning unit 53 while the first scanning unit 53 and the second scanning unit 54 are moved in a sub-scanning direction, then light reflected from the surface of the original is guided to the image forming lens 55 by the first scanning unit 53 and the second scanning unit 54, and the image of the original is formed on the CCD 56 by the image forming lens 55. At this time, the first scanning unit 53 and the second scanning unit 54 are moved while maintaining a predetermined speed relationship therebetween, and the positional relationship between the first scanning unit 53 and the second scanning unit 54 is constantly maintained such that there is no change in the length of the optical path of the reflected light from the surface of the original to the CCD 56 via the first scanning unit 53, the second scanning unit 54 and the image forming lens 55. Thus, the state of the image of the original on the CCD 56 being accurately focused on is always maintained.

The entire image of the original that has thus been read is transmitted to a laser exposing apparatus 1 of the image forming apparatus 100 as image data, and the image is printed on recording paper in the image forming apparatus 100.

The image forming apparatus 100 is provided with the laser exposing apparatus 1, development apparatuses 2, photosensitive drums 3, charging units 5, cleaner apparatuses 4, an intermediate transfer belt apparatus 8, a fixing apparatus 12, a paper transport path S, a paper feed tray 10, a paper discharge tray 15, and the like, in order to print images on recording paper.

Image data handled in the image forming apparatus 100 corresponds to a color image using black (K), cyan (C), magenta (M), and yellow (Y), or corresponds to a monochrome image using a single color (for example, black). Accordingly, four each of the development apparatuses 2, the photosensitive drums 3, the charging units 5, and the cleaner apparatuses 4 are provided so as to form four types of toner images corresponding to the respective colors, and respectively associated with black, cyan, magenta and yellow to constitute four image stations Pa, Pb, Pc and Pd.

The photosensitive drums 3 are disposed approximately in the center of the image forming apparatus 100.

The charging unit 5 is a charging means for uniformly charging the surface of the photosensitive drum 3 to a predetermined potential, and other than a contact-roller-type charging unit or a contact-brush-type charging unit, a charging-type charging unit is used.

The laser exposing apparatus 1 is a laser scanning unit (LSU) provided with a laser diode and a reflecting mirror, and exposes the charged surface of the photosensitive drum 3 according to the image data, to form an electrostatic latent image that corresponds to the image data on that surface.

The development apparatus 2 develops the electrostatic latent image formed on the photosensitive drum 3 using toner (K, C, M, and Y). The cleaner apparatus 4 removes and collects toner remaining on the surface of the photosensitive drum 3 after development and image transfer.

The intermediate transfer belt apparatus 8 that is disposed above the photosensitive drum 3 is provided with an intermediate transfer belt 7, an intermediate transfer belt drive roller 21, an idler roller 22, an intermediate transfer roller 6, and an intermediate transfer belt cleaning apparatus 9.

The intermediate transfer belt 7 is supported stretched across the intermediate transfer belt drive roller 21, the intermediate transfer roller 6, the idler roller 22, and so forth, which cause the intermediate transfer belt 7 to revolve in the direction of arrow C.

The intermediate transfer roller 6 is rotatably supported near the intermediate transfer belt 7, and is pressed against the photosensitive drum 3 via the intermediate transfer belt 7. A transfer bias for transferring a toner image on the photosensitive drum 3 to the intermediate transfer belt 7 is applied to the intermediate transfer roller 6.

The intermediate transfer belt 7 is provided so as to be in contact with the photosensitive drums 3. Toner images on the surface of the photosensitive drums 3 are sequentially transferred and superimposed to the intermediate transfer belt 7, thereby forming a color toner image (toner images of the respective colors). This intermediate transfer belt 7 is formed as an endless belt employing a film having a thickness of about 100 μm to 150 μm.

The transfer of the toner image from the photosensitive drum 3 to the intermediate transfer belt 7 is performed by the intermediate transfer roller 6 pressing against the back face of the intermediate transfer belt 7. A high voltage transfer bias (a high voltage of opposite polarity (+) to the toner charging polarity (−)) for transferring the toner image is applied to the intermediate transfer roller 6. The intermediate transfer roller 6 is a roller that has a metal (for example, stainless steel) shaft with a diameter of 8 to 10 mm as a base, the surface of that shaft being covered by a conductive elastic material (for example, EPDM, urethane foam, or the like). With this conductive elastic material, it is possible to uniformly apply a high voltage to recording paper.

As described above, the toner images on the surface of the photosensitive drums 3 are layered on the intermediate transfer belt 7 to become a color toner image indicated by image data. The toner images of the respective colors that have been layered in this way are transported along with the intermediate transfer belt 7, and transferred onto the recording paper by a transfer roller **11*a* of a secondary transfer apparatus 11 that is in contact with the intermediate transfer belt 7**.

The intermediate transfer belt 7 and the transfer roller **11*a* of the secondary transfer apparatus 11 are pressed against each other to form a nip region. Also, a voltage (a high voltage of opposite polarity (+) to the toner charging polarity (−)) for transferring the toner images of the respective colors on the intermediate transfer belt 7 to the recording paper is applied to the transfer roller 11*a* of the secondary transfer apparatus 11. Furthermore, in order to constantly obtain the nip region, either one of the transfer roller 11*a* of the secondary transfer apparatus 11 or the intermediate transfer belt drive roller 21** is made of a hard material (metal or the like), and the other roller is made of a soft material, such as an elastic roller (elastic rubber roller, foam resin roller, or the like).

Toner may remain on the intermediate transfer belt 7, without the toner image on the intermediate transfer belt 7 being completely transferred onto the recording paper by the secondary transfer apparatus 11. This remaining toner causes toner color mixing to occur in a subsequent process. Therefore, the remaining toner is removed and collected by the intermediate transfer belt cleaning apparatus 9. In the intermediate transfer belt cleaning apparatus 9, a cleaning blade is provided that removes the remaining toner by being in contact with the intermediate transfer belt 7 as a cleaning member, for example, and the back side of the intermediate transfer belt 7 is supported by the idler roller 22 at the location where the cleaning blade is in contact.

The paper feed tray 10 is for storing recording paper, is provided in the lower part of the image forming apparatus 100, and supplies recording paper in the tray.

The paper transport path S having an S shape for feeding recording paper that has been supplied from the paper feed tray 10 to the paper discharge tray 15 via the secondary transfer apparatus 11 and the fixing apparatus 12 is provided in the image forming apparatus 100. A paper pickup roller 16, paper registration rollers 14, the fixing apparatus 12, transport rollers that transport the recording paper, and the like are disposed along the paper transport path S.

The pickup roller 16 is a draw-in roller that is provided on the edge portion of the paper feed tray 10 and that supplies sheets of recording paper one-by-one from the paper feed tray 10 to the paper transport path S. The transport rollers are small rollers for promoting and assisting transport of the recording paper, and a plurality of the transport rollers are provided.

The paper registration rollers 14 temporarily stop recording paper that has been transported, align the leading edge of the recording paper, and transport the recording paper in a timely manner in coordination with rotation of the photosensitive drums 3 and the intermediate transfer belt 7, such that the color toner image on the intermediate transfer belt 7 is transferred onto the recording paper in the nip region between the intermediate transfer belt 7 and the transfer roller 11*a* of the secondary transfer apparatus 11.

For example, the paper registration rollers 14 transports the recording paper, based on the detection output from a pre-registration detection switch (not shown), such that the leading edge of the color toner image on the intermediate transfer belt 7 matches the leading edge of the image forming region of the recording paper in the nip region between the intermediate transfer belt 7 and the transfer roller 11*a* of the secondary transfer apparatus 11.

The fixing apparatus 12 is provided with a hot roller 31, a pressure roller 32, and so forth. The hot roller 31 and the pressure roller 32 sandwich and transport recording paper that has passed through the nip region between the intermediate transfer belt 7 and the transfer roller 11*a* of the secondary transfer apparatus 11.

The hot roller 31 is controlled based on the detection output from a temperature detector (not shown) to become a predetermined fixing temperature, and has a function of, by applying heat and pressure together with the pressure roller 32 to the recording paper, fusing, mixing, and applying pressure to the toner image that has been transferred onto the recording paper, thus thermally fixing that toner image on the recording paper.

After the toner images of the respective colors have been fixed, the recording paper is discharged face-down on the paper discharge tray 15 by the transport rollers.

Next, the air cleaner 71 is described. The air cleaner 71 is supported at the upper end of a support column 72 that protrudes from one corner of the back of the main body of the image forming apparatus 100, generates positive and negative ions, and emits the positive and negative ions upward together with the air.

There are many cases where the image forming apparatus 100 is disposed such that the back side thereof is near the wall of the room, and accordingly the air cleaner 71 will also be disposed near the wall of the room. In this case, most of the air emitted upward from the air cleaner 71 goes up along the wall, is blown onto the ceiling, spreads along the ceiling, and spreads widely throughout the room. Therefore, positive and negative ions included in the air emitted from the air cleaner 71 also spread widely throughout the room, and thus airborne bacteria in the air in the room are effectively eliminated by the positive and negative ions.

Further, some of the air emitted upward from the air cleaner 71 goes directly down, floats in the vicinity of the image forming apparatus 100, and covers the entire main body of the image forming apparatus 100. Then, positive and negative ions included in the air decompose and reduce exhaust gas from the image forming apparatus 100.

The electrophotographic image forming apparatus 100 may produce exhaust gas such as ozone, and thus a filter for reducing such gas or the like may be provided in the image forming apparatus 100. However, since positive and negative ions can decompose and reduce exhaust gas, a filter that is provided inside or the like can be omitted.

Since the air cleaner 71 is disposed above the image forming apparatus 100, space for only installing the air cleaner 71 is not particularly necessary, and thus this space can be saved.

Further, since the air cleaner 71 is supported at the upper end of the support column 72 that protrudes from the image forming apparatus 100, there is open space between the image forming apparatus 100 and the air cleaner 71, and thus the usability of the image forming apparatus 100 is not impaired.

Figure 2:
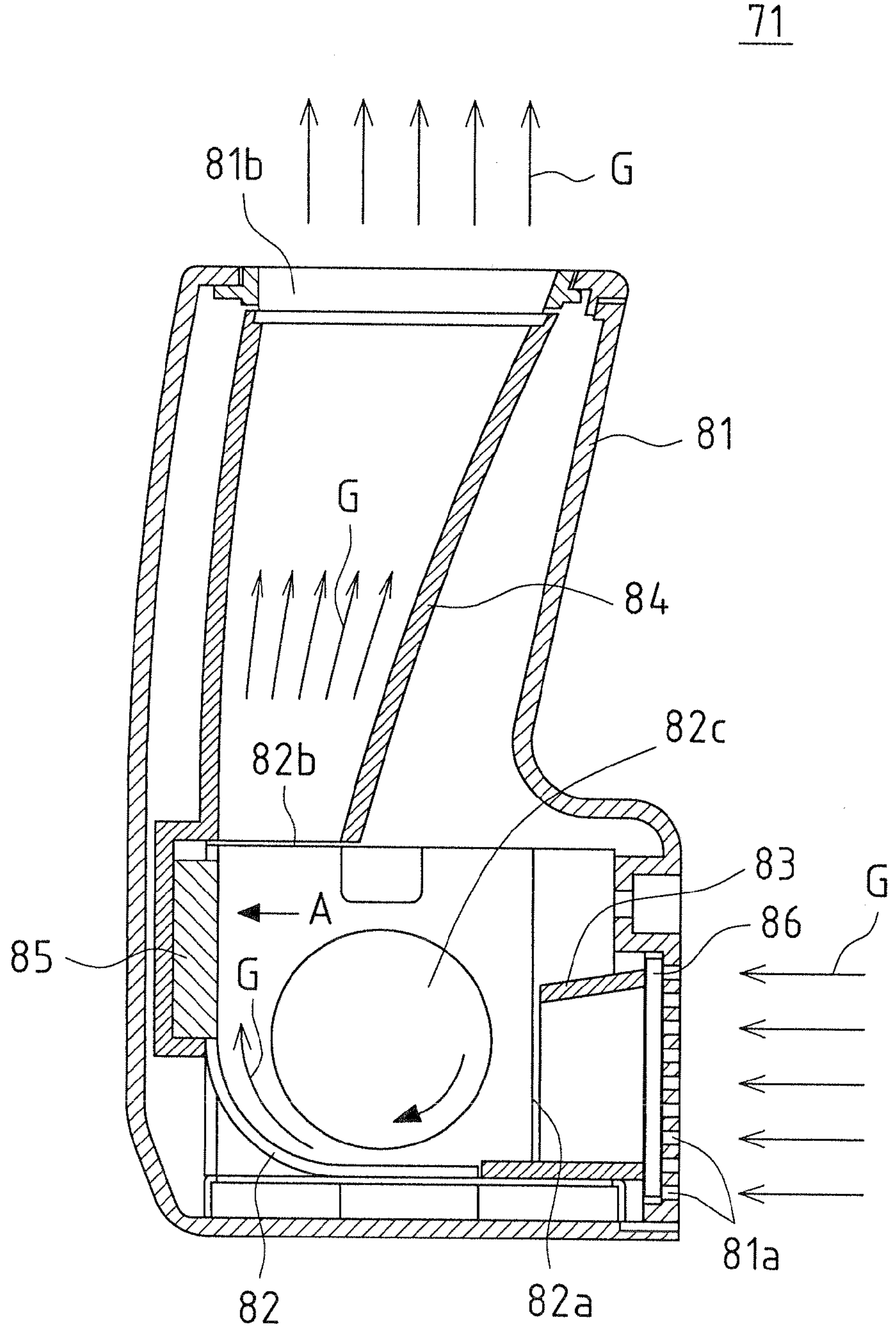
FIG. 2 is a cross-sectional view showing an air cleaner in the image forming system shown in FIG. 1.

FIG. 2 is a cross-sectional view showing the air cleaner 71. The air cleaner 71 is provided with a main casing 81, a fan unit 82 disposed at the lower part of the main casing 81, a plurality of intake holes 81*a* formed in the wall of the lower part of the main casing 81, a filter 86 disposed so as to overlap the intake holes 81*a*, an intake duct 83 disposed between the filter 86 and an intake aperture 82*a* of the fan unit 82, an upper outlet aperture 81*b* formed in the upper part of the main casing 81, a outlet duct 84 disposed between the upper outlet aperture 81*b* and a outlet aperture 82*b* of the fan unit 82, and a plurality of ion generating elements 85 disposed on the periphery of the fan unit 82.

As shown in FIG. 1, since the air cleaner 71 is long in the width direction of the image forming apparatus 100, the main casing 81, the fan unit 82, the intake holes 81*a*, the intake duct 83, the outlet aperture 82*b*, the outlet duct 84, and the like are also long in the width direction of the image forming apparatus 100, and the plurality of ion generating elements 85 are arranged in the width direction of the image forming apparatus 100.

When a fan 82*c* of the fan unit 82 is rotationally driven by a motor (not shown), airflow is generated as shown by arrows G, and air is drawn into the fan unit 82 via a route of the intake holes 81*a*, the filter 86, and the intake duct 83, then after the air has passed near the ion generating elements 85, the air is emitted from the upper outlet aperture 81*b* via the outlet duct 84. At this time, the filter 86 adsorbs and removes dust and the like in the air.

Figure 3:
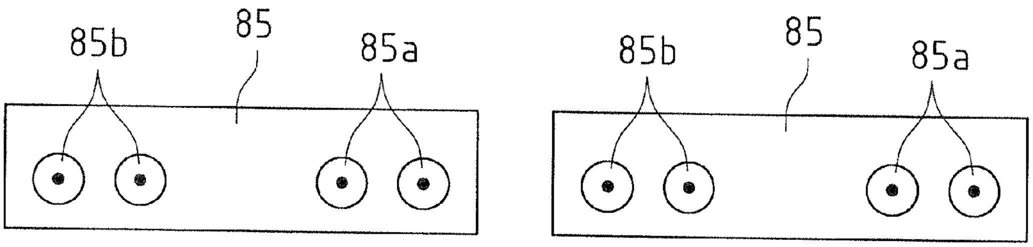
FIG. 3 is a plan view showing examples of Plasmacluster Ion generating elements of the air cleaner in FIG. 2.

The ion generating elements 85 are Plasmacluster Ion (registered trademark) generating elements (PCI). When the ion generating elements 85 are viewed from the arrow A direction in FIG. 2, two of the ion generating elements 85 are arranged in the width direction of the image forming apparatus 100 as shown in FIG. 3, and a pair of positive ion generating portions 85*a* that generate positive ions and a pair of negative ion generating portions 85*b* that generate negative ions are arranged in each of the ion generating elements 85. The above ion generating element 85 is disclosed in detail in JP 2002-58731A that the applicant of the present invention previously lodged.

The positive and negative ions generated by the ion generating elements 85 are emitted from the upper outlet aperture 81*b* via the outlet duct 84 together with the airflow generated by the fan 82*c* of the fan unit 82.

The amount of air emission from the air cleaner 71 can be adjusted by changing the rotational speed of the motor of the fan 82*c*. If the amount of air emission is increased, air including positive and negative ions spreads over a wider area, thereby purifying the air over the wider area. Further, if the amount of air emission is reduced, air including positive and negative ions tends to float in the vicinity of the image forming apparatus 100, and thus exhaust gas from the image forming apparatus 100 can be more effectively decomposed and reduced.

Figure 4:
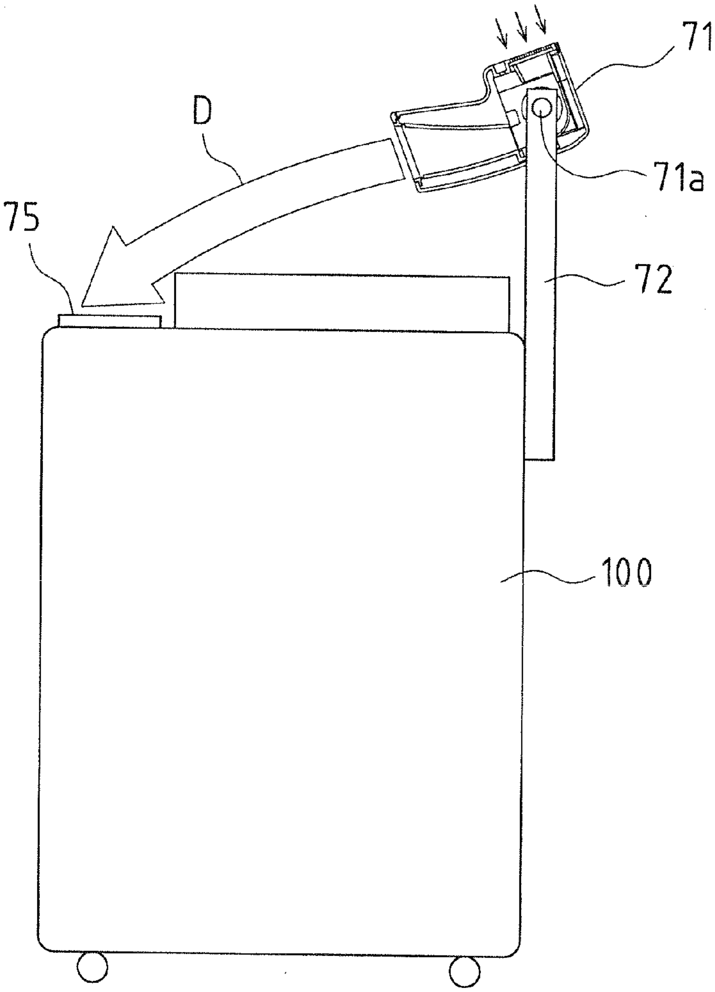
FIG. 4 is a lateral view showing a state in which the direction of ion emission from the air cleaner in the image forming system shown in FIG. 1 is set diagonally downward.

Further, the direction of air emission from the air cleaner 71 may be set, not upward, but diagonally downward, which is indicated by the arrow D, as shown in FIG. 4. Alternatively, a configuration may be adopted in which a shaft 71*a* on one end side of the air cleaner 71 is rotationally supported at the upper end of the support column 72, the shaft 71*a* is rotated by a motor driving, and the air cleaner 71 is rotated about the shaft 71*a*, thereby changing the direction of air emission from the air cleaner 71. Moreover, the air cleaner 71 may be rotated in a reciprocating manner about the shaft 71*a* within a prescribed angle range, that is, the air cleaner 71 may be operated in a swinging manner, thereby widening the area of positive and negative ion emission.

Figure 5:
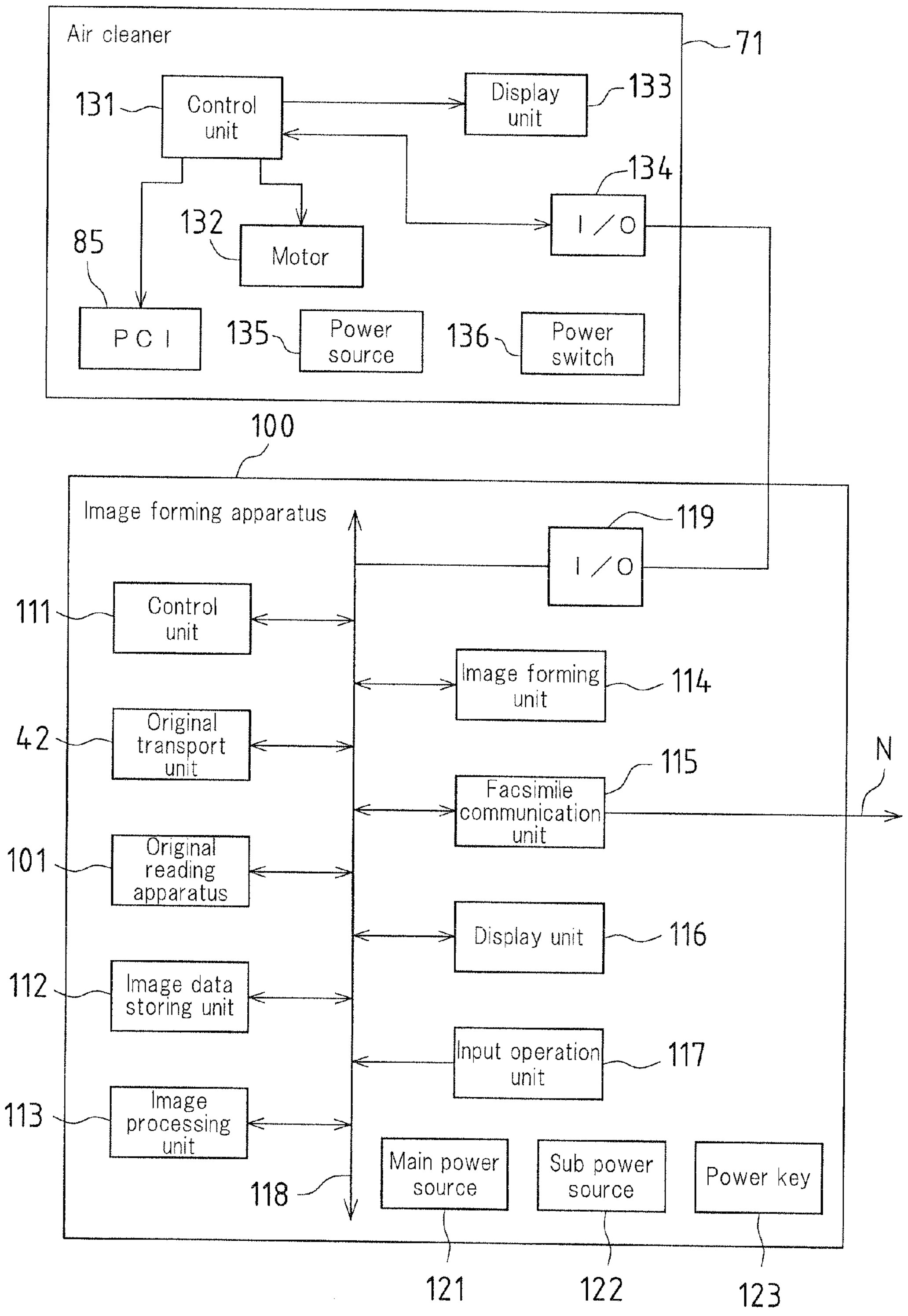
FIG. 5 is a block diagram showing the configurations of the image forming apparatus and the air cleaner in the image forming system shown in FIG. 1.

FIG. 5 is a block diagram showing the configurations of the image forming apparatus 100 and the air cleaner 71. As shown in FIG. 5, the image forming apparatus 100 is provided with a control unit 111 that performs overall control of the image forming apparatus 100, the original transport unit 42, the original reading apparatus 101, an image data storing unit 112, an image processing unit 113, an image forming unit 114, a facsimile communication unit 115, a display unit 116 that displays various information, an input operation unit 117 that is operated by a user, a bus 118 that interconnects the units, an input/output unit 119, a main power source 121, a sub power source 122, a power key 123, and so on.

The control unit 111 is constituted by a CPU (Central Processing Unit), a ROM (Read Only Memory) that stores, for instance, various programs executed by the CPU, a RAM (Random Access Memory) that is used as a work area of the CPU, and so on, and performs overall control of the image forming apparatus 100 by the CPU executing the programs, and performing data processing.

Further, the control unit 111 is connected to the air cleaner 71 via the input/output unit 119, and controls the operation of the air cleaner 71.

The original transport unit 42 and the original reading apparatus 101, which are also shown in FIG. 1, transport an original and read an image of the original.

The image data storing unit 112 is a hard disk apparatus or the like, and stores image data that indicate images of originals read by the original reading apparatus 101 and images received from the outside. The image processing unit 113 performs various processes on image data stored in the image data storing unit 112.

The image forming unit 114 is constituted by the laser exposing apparatus 1, the development apparatuses 2, the photosensitive drums 3, the charging units 5, the cleaner apparatuses 4, the intermediate transfer belt apparatus 8, the fixing apparatus 12, the paper transport path S, the paper feed tray 10, the paper discharge tray 15, and the like, which are shown in FIG. 1, and prints an image of an original on recording paper.

The facsimile communication unit 115 is connected to a network N, and executes a facsimile communication protocol with another terminal to transmit and receive image data via the network N.

The display unit 116 is, for example, a liquid crystal display apparatus, and displays operational guidance for the image forming apparatus 100, and the like. The input operation unit 117 is provided with various keys and buttons that are operated by the user, or a touch panel superimposed on the screen of the display unit 116, detects the keys and the buttons operated by the user, or detects the keys and the like on the screen of the display unit 116 selected by the user via the touch panel, thereby outputting input instructions given by the user to the control unit 111.

The main power source 121 supplies power to the units other than the facsimile communication unit 115, and supplies operating power to the control unit 111, the original transport unit 42, the original reading apparatus 101, the image data storing unit 112, the image processing unit 113, the image forming unit 114, the display unit 116, the input operation unit 117, the input/output unit 119, and the like. Further, the sub power source 122 is a dedicated power source for the facsimile communication unit 115, and only supplies operating power to the facsimile communication unit 115.

The power key 123 is a key operated by the user, and is operated to set the image forming apparatus 100 to a night mode or to resume the image forming apparatus 100 from the night mode.

On the other hand, the air cleaner 71 is provided with a control unit 131 that performs overall control of the air cleaner 71, a motor 132 that causes the fan 82*c* to rotate, a display unit 133, an input/output unit 134, the ion generating elements 85, a power source 135, a power switch 136, and the like.

The control unit 131 is constituted by a CPU, a ROM that stores, for instance, various programs executed by the CPU, a RAM that is used as a work area of the CPU, and so on, and performs overall control of the air cleaner 71 by the CPU executing the programs.

Further, the control unit 131 is connected to the image forming apparatus 100 via the input/output unit 134, and controls the operation of the air cleaner 71 in response to instructions from the control unit 111 of the image forming apparatus 100.

The motor 132 is for rotationally driving the fan 82*c* of the fan unit 82 shown in FIG. 2. The ion generating elements 85 are PCI generating elements shown in FIGS. 2 and 3.

The display unit 133 is constituted by, for example, a plurality of LEDs, selectively illuminates or flashes the LEDs, and informs the user of various information by this selective illumination or flashing.

The power source 135 supplies operating power to the control unit 131, the motor 132, the display unit 133, the input/output unit 134, the ion generating element 85, and the like.

The power switch 136 is a switch that is operated by the user, and is operated to turn on and off the power supply from the power source 135.

Note that with the image forming apparatus 100, the keys of the input operation unit 117 and the screen of the display unit 116 are provided on one operation panel, and this operation panel is disposed facing upward. This makes it easy for the user who stands in front of the image forming apparatus 100 to operate the keys and view the screen by looking down at the operation panel.

However, if the operation panel is disposed facing upward, the screen of the display unit 116 also faces upward, and thus this screen cannot be viewed from a distance. Accordingly, even if the operating state of the image forming apparatus 100 is displayed on the display unit 116, the operating state of the image forming apparatus 100 cannot be checked from a distance.

In view of this, in Embodiment 1 of the present invention, the operating state of the image forming apparatus 100 is displayed not only on the display unit 116, but also by the display unit 133 of the air cleaner 71. The air cleaner 71 is supported at the upper end of the support column 72 that protrudes from the image forming apparatus 100, and is thus disposed at a high position. Therefore, it can be said that the display unit 133 of the air cleaner 71 is also disposed at a high position. Since it is possible to view the display unit 133 of the air cleaner 71 disposed at a high position even from a distance, it is possible to check the operating state of the image forming apparatus 100 that is displayed using the LEDs of the display unit 133 from a distance.

Further, although a warm-up mode for setting the fixing temperature of the roller of the fixing apparatus 12, or a print processing mode for performing print processing is set in the image forming apparatus 100, since power consumption in these modes is large, a standby mode for reducing power consumption, a power saving mode for further reducing power consumption, the night mode for further still reducing power consumption, or the like is also settable when print processing is not performed. Accordingly, the standby mode, the power saving mode, and the night mode are modes for economizing power.

For example, in the standby mode, the fixing temperature is decreased by reducing the power to a heater that heats the roller of the fixing apparatus 12, and thus power consumption of the image forming apparatus 100 is reduced. In the power saving mode, the power to the heater that heats the roller of the fixing apparatus 12 is further reduced, the image data storing unit 112, the image processing unit 113, the image forming unit 114, the display unit 116, the input operation unit 117, and the like (the units involved with print processing) are selectively stopped, and thus power consumption of the image forming apparatus 100 is further reduced. In the night mode, the fixing apparatus 12 is turned off, all the units involved with print processing are stopped, and only the facsimile communication unit 115, the input/output unit 119, and some of the functions of the control unit 111 are allowed to remain operating.

In the night mode, even if print processing with the image forming apparatus 100 is not performed because people are not around at night, the facsimile communication unit 115 is allowed to remain operating since there is the possibility of receiving the arrival of facsimile communication. Further, the operation of the input/output unit 119 and some of the functions of the control unit 111 is continued in order to start the units involved with print processing of the image forming apparatus 100 and record an image indicated by image data received by the facsimile communication unit 115 on recording paper, or in order to control the air cleaner 71 by the control unit 111.

In this night mode, in order to allow the facsimile communication unit 115 to remain operating, the sub power source 122 is kept on, and the power supply from the sub power source 122 to the facsimile communication unit 115 is continued. Further, in order to allow only the input/output unit 119 and some of the functions of the control unit 111 to remain operating, power supply from the main power source 121 to the units involved with print processing of the image forming apparatus 100 is stopped, and power supply from the main power source 121 is continued to the input/output unit 119 and the control unit 111.

Here, with the image forming apparatus 100, even if a mode for economizing power is set, when trouble such as failure of the image forming apparatus 100 occurs, it is necessary to immediately report this.

Similarly, with the air cleaner 71 as well, when trouble such as failure of the air cleaner 71 occurs, it is necessary to immediately report this.

Therefore, with both the image forming apparatus 100 and the air cleaner 71, it is desirable to always allow the respective display units 116 and 133 to remain operating, and power consumption for the operation of the display units 116 and 133 is necessary. However, with the image forming apparatus 100, if the display unit 116 is always allowed to remain operating, power consumption of the display unit 116 cannot be reduced when in a mode for economizing power.

In view of this, in Embodiment 1 of the present invention, even when the image forming apparatus 100 is set to a mode for economizing power, the operating state of the image forming apparatus 100 is displayed by the display unit 133 of the air cleaner 71. Accordingly, when the image forming apparatus 100 is set to a mode for economizing power, it is not necessary to allow the display unit 116 of the image forming apparatus 100 to remain operating, and thus power consumption of the display unit 116 of the image forming apparatus 100 can be reduced. For example, in the night mode, power consumption of the display unit 116 can be reduced by stopping the display unit 116 of the image forming apparatus 100.

Further, when in another mode that is not a mode for economizing power, that is, the warm-up mode or the print processing mode, the operating state of the image forming apparatus 100 is displayed by the display unit 133 of the air cleaner 71. Moreover, not only the operating state of the image forming apparatus 100, but also the operating state of the air cleaner 71 is displayed by the display unit 133 of the air cleaner 71. Accordingly, the user can recognize the operating states of both the image forming apparatus 100 and the air cleaner 71 by only looking at display content of the display unit 133 of the air cleaner 71, and thus it will be easy to manage both of the apparatuses.

Moreover, when the image forming apparatus 100 is set to a mode for economizing power, even if the display unit 133 of the air cleaner 71 is caused to display the operating state of the image forming apparatus 100, the functionality of the image forming apparatus 100 is not impaired, and the functionality of the air cleaner 71 is not impaired either.

Figure 6A:
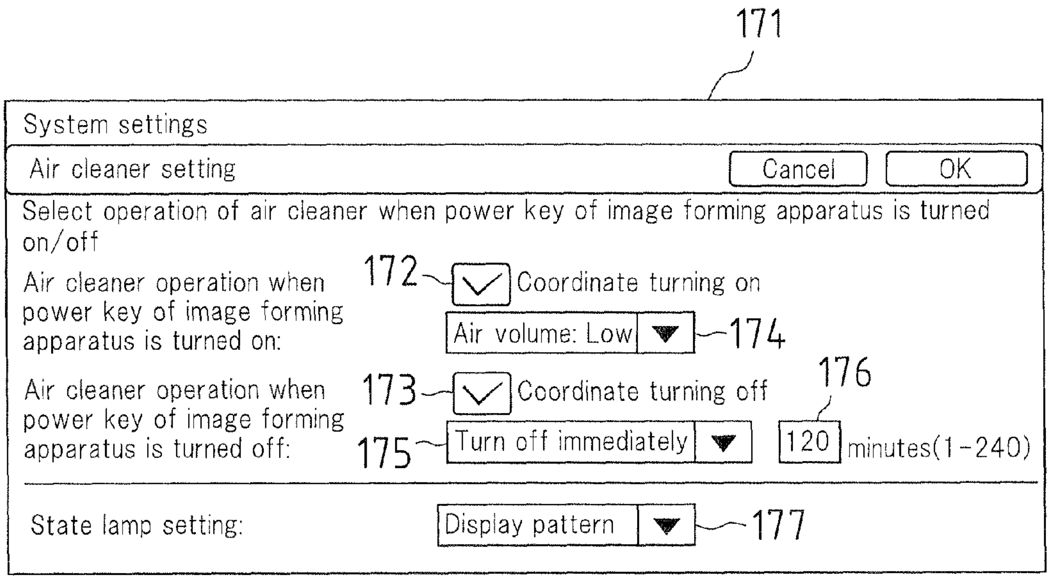
FIG. 6A is a plan view showing an input setting screen for setting an air cleaning operation of the air cleaner.

Next is a description of input settings that are necessary to cause the display unit 133 of the air cleaner 71 to display such an operating state of the image forming apparatus 100, with reference to FIGS. 6A, 6B, and 6C.

The input settings are made not only for causing the display unit 133 of the air cleaner 71 to display the operating state of the image forming apparatus 100, but also for achieving simplification of operating the air cleaner 71 by stopping or restarting an air cleaning operation of the air cleaner 71 in coordination with the image forming apparatus 100 transitioning to the night mode or resuming from the night mode.

Such input settings are made, with an input setting screen being displayed on the display unit 116 of the image forming apparatus 100, by performing input with respect to the input setting screen by operating the touch panel of the input operation unit 117. The control unit 111 displays various input setting screens on the display unit 116 in accordance with a procedure set in advance, and if an input is made with respect to the input setting screen by operating the touch panel of the input operation unit 117, the control unit 111 sets and stores this entry content. Then, the control unit 111 reads out and executes the entry content, and controls the air cleaner 71 when performing an operation for controlling the image forming apparatus 100.

Further, although FIGS. 6A, 6B, and 6C show turning on/off the power key 123 of the image forming apparatus 100, the main power source 121 and the sub power source 122 are not completely turned on/off by turning on/off the power key 123. Turning on the power key 123 gives an instruction to transition from the night mode to the warm-up mode, and turning off the power key 123 gives an instruction to set the night mode. Therefore, if the power key 123 of the image forming apparatus 100 is turned off, the night mode is set, thereby stopping the units involved with print processing of the image forming apparatus 100. However, the operation of the facsimile communication unit 115, the input/output unit 119, and some of the functions of the control unit 111 is continued.

Similarly, although turning on/off the operation of the air cleaner 71 is shown, turning on/off the operation gives an instruction whether or not the air cleaner 71 is to perform the air cleaning operation. If the operation of the air cleaner 71 is turned off, although the motor 132 and the ion generating elements 85 are stopped, the operation of the input/output unit 134, the display unit 133, and some of the functions of the control unit 131 is continued.

An initial setting screen (not shown) for selecting any of the various settings is displayed on the display unit 116 of the image forming apparatus 100. If setting of coordinated operation of the image forming apparatus 100 and the air cleaner 71 is selected in this initial setting screen by the touch panel of the input operation unit 117 being operated, an input setting screen 171 as shown in FIG. 6A is displayed on the display unit 116. The charts in FIGS. 6B and 6C show operation names, descriptions of the operations, and the like that correspond to checkboxes 172 and 173, selection boxes 174, 175, and 177, and an input box 176 in the input setting screen 171 in FIG. 6A.

As is clear from FIGS. 6A, 6B, and 6C, the checkbox 172 for turning on the operation of the air cleaner 71 in coordination with the power key 123 of the image forming apparatus 100 being turned on, and the selection box 174 for setting the air volume of the air cleaner 71 to "high" or "low" are displayed in the input setting screen 171. If a check mark is put in the checkbox 172, and the air volume "high" or "low" is selected in the selection box 174 by the touch panel of the input operation unit 117 being operated, the operation of the air cleaner 71 is set so as to be turned on in coordination with the power key 123 of the image forming apparatus 100 being turned on, and the air volume of the air cleaner 71 is set so as to be "high" or "low".

Further, in the input setting screen 171, the checkbox 173 for turning off the operation of the air cleaner 71 in coordination with the power key 123 of the image forming apparatus 100 being turned off, the selection box 175 for setting whether or not the operation of the air cleaner 71 is to be immediately turned off in coordination with the power key 123 being turned off, and the input box 176 for inputting an arbitrary prescribed time period that is measured from when the power key 123 is turned off until when the operation of the air cleaner 71 is turned off are displayed. If a check mark is put in the checkbox 173, and "immediately turn off the operation of the air cleaner 71" is selected in the selection box 175 by the touch panel of the input operation unit 117 being operated, the operation of the air cleaner 71 is set so as to be immediately turned off in coordination with the power key 123 of the image forming apparatus 100 being turned off. Further, if a check mark is put in the checkbox 173, "do not immediately turn off the operation of the air cleaner 71" is selected in the selection box 175, and an arbitrary prescribed time period is inputted in the input box 176 by the numeric keypad of the input operation unit 117 being operated, a timer is started in coordination with the power key 123 of the image forming apparatus 100 being turned off, and the operation of the air cleaner 71 is set so as to be turned off after the timer measures the prescribed time period.

Moreover, the selection box 177 for selecting a display pattern for display performed by the display unit 133 of the air cleaner 71 is displayed. If either first or second display pattern is selected in the selection box 177 by the touch panel of the input operation unit 117 being operated, setting is performed such that the display unit 133 performs display using this selected display pattern.

Table 1 shows, in an organized manner, coordinated operation of the image forming apparatus 100 and the air cleaner 71 and display patterns for display performed by the display unit 133 of the air cleaner 71, which are thus set. The control unit 111 of the image forming apparatus 100 stores item a or b, item c or d, and item e in Table 1 as a data table, and uses this data table for controlling the air cleaner 71.

TABLE 1

| | Coordinated operation determination | Operation of air cleaner | Actual operation |
|---|---|---|---|
| a | Coordinate with power key of image forming apparatus being turned on | Turn on<br>Set air volume to high or low | Start air cleaning operation in coordination with transition from night mode to warm-up mode |
| b | Do not coordinate with power key of image forming apparatus being turned on | Do not switch operation | Do not switch operation of air cleaner |
| c | Coordinate with power key of image forming apparatus being turned off | Turn off<br>Turn timer on or off<br>Arbitrary prescribed time period | Stop air cleaning operation in coordination with night mode being set |
| d | Do not coordinate with power key of image forming apparatus being turned off | Do not switch operation | Do not switch operation of air cleaner |
| | Display pattern selection | | |
| e | First or second display pattern | | |

Figure 7:
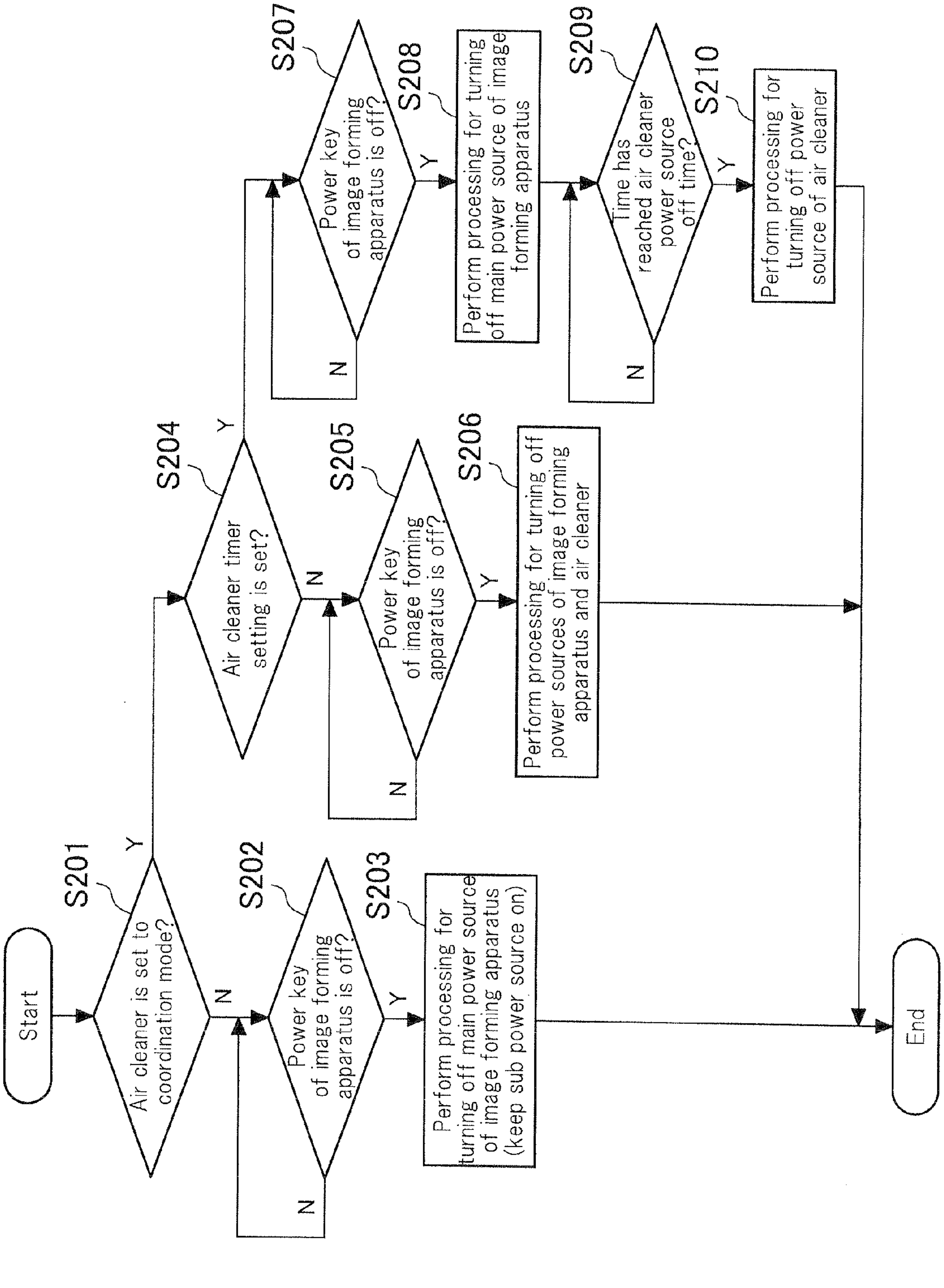
FIG. 7 is a flowchart showing a control procedure for a control unit of the image forming apparatus controlling the air cleaner when a night mode is set.

Next is a description of a control procedure for the control unit 111 of the image forming apparatus 100 controlling the air cleaner 71 when the night mode is set, with reference to the flowchart in FIG. 7.

During the daytime, the power key 123 of the image forming apparatus 100 is on, and the image forming apparatus 100 is set to either the print processing mode, the standby mode, or the power saving mode. At this time, the control unit 111 checks which of "coordinate with power key being turned off" or "do not coordinate with power key being turned off" is set, by referring to the content of the data table corresponding to item c or d in Table 1 (step S201).

For example, when "do not coordinate with power key being turned off" in item d is set ("No" in step S201), the control unit 111 stands by until the power key 123 of the image forming apparatus 100 is turned off at night (step S202), and if the power key 123 is turned off ("Yes" in step S202), the control unit 111 sets the image forming apparatus 100 to the night mode (step S203), and continues the operation of the air cleaner 71. When the image forming apparatus

100 is in the night mode, the power supply from the main power source 121 to the units involved with print processing is stopped, the power supply from the main power source 121 to the input/output unit 119 and the control unit 111 is continued, and the sub power source 122 is kept on, thus continuing the power supply from the sub power source 122 to the facsimile communication unit 115.

Further, if "coordinate with power key being turned off" in item c is set ("Yes" in step S201), the control unit 111 checks which of "timer on" or "timer off" is set, by referring to the content of the data table corresponding to item c (step S204).

If "timer off" is set ("No" in step S204), the control unit 111 stands by until the power key 123 of the image forming apparatus 100 is turned off at night (step S205), and when the power key 123 is turned off ("Yes" in step S205), the control unit 111 sets the image forming apparatus 100 to the night mode, and also stops the air cleaning operation of the air cleaner 71 (step S206). The air cleaning operation of the air cleaner 71 being stopped means that the motor 132 and the ion generating elements 85 are stopped, and the operation of the input/output unit 134, the display unit 133, and some of the functions of the control unit 131 is continued.

Further, if "timer on" is set ("Yes" in step S204), the control unit 111 stands by until the power key 123 of the image forming apparatus 100 is turned off (step S207), and when the power key 123 is turned off ("Yes" in step S207), the control unit 111 sets the image forming apparatus 100 to the night mode (step S208). At the same time, the control unit 111 obtains a prescribed time period to be measured by the timer by referring to the content of the data table corresponding to item c, and starts measuring the prescribed time period with the timer. Then, when the timer finishes measuring the prescribed time period, that is, when the prescribed time period has elapsed since the point in time when the power key 123 of the image forming apparatus 100 is turned off ("Yes" in step S209), the control unit 111 stops the air cleaning operation of the air cleaner 71 (step S210).

Thus, when the power key 123 is turned off at night, the image forming apparatus 100 is set to the night mode, and the air cleaning operation of the air cleaner 71 is continued or stopped. After this, when the power key 123 is turned on in the morning, the image forming apparatus 100 transitions from the night mode to the warm-up mode. At this time, the control unit 111 checks which of "coordinate with power key being turned on" or "do not coordinate with power key being turned on" is set, by referring to the content of the data table corresponding to item a or b in Table 1. For example, if "do not coordinate with power key being turned on" in item b is set, although the control unit 111 sets the image forming apparatus 100 to the warm-up mode in response to the power key 123 of the image forming apparatus 100 being turned on, the control unit 111 does not restart the air cleaning operation of the air cleaner 71. It should be noted that if the air cleaner 71 is performing the air cleaning operation when the image forming apparatus 100 is in the night mode, this air cleaning operation is continued.

Further, if "coordinate with power key being turned on" in item a is set, the control unit 111 sets the image forming apparatus 100 to the warm-up mode in response to the power key 123 of the image forming apparatus 100 being turned on, and also restarts the air cleaning operation of the air cleaner 71. If the air cleaner 71 is performing the air cleaning operation when the image forming apparatus 100 is in the night mode, this air cleaning operation is continued.

Moreover, the control unit 111 checks a setting of the air volume of the air cleaner 71 by referring to the content of the data table corresponding to item a when restarting the air cleaning operation of the air cleaner 71, and if the air volume is set to "high", the control unit 111 drives the fan 82*c* to rotate at a high speed by increasing the rotational speed of the motor 132, thus increasing the air volume of the air cleaner 71. Further, if the air volume is set to "low", the control unit 111 drives the fan 82*c* to rotate at a low speed by decreasing the rotational speed of the motor 132, thus reducing the air volume of the air cleaner 71.

Since the air cleaning operation of the air cleaner 71 is thus stopped or restarted according to the image forming apparatus 100 being set to the night mode and transitioning from the night mode to the warm-up mode, power consumption of the air cleaner 71 can be reduced without needing to particularly operate the air cleaner 71, and without impairing the effect of the air cleaner 71 at all.

Note that although the air cleaning operation of the air cleaner 71 is turned on/off in response to the power key 123 of the image forming apparatus 100 being turned on/off, that is, the key operation performed by the user, the air cleaner 71 can also be coordinated following the same procedure as that in FIG. 7 in the case where the night mode is set automatically and a transition is made from the night mode to the warm-up mode based on a time schedule that has been set in advance in the image forming apparatus 100.

Next is a description of a control procedure for causing the display unit 133 of the air cleaner 71 to display the operating state of the image forming apparatus 100.

In the image forming apparatus 100, the display unit 116 is allowed to remain operating when the warm-up mode or the print processing mode is set. However, reduction of power consumption is achieved by stopping the display unit 116 when a mode for economizing power such as the standby mode, the power saving mode, or the night mode is set. Further, when the warm-up mode, the print processing mode, or even any of the modes for economizing power is set, the operating state of the image forming apparatus 100 is displayed by the display unit 133 of the air cleaner 71, thus preventing the display of the operating state of the image forming apparatus 100 from being interrupted, and the operating states of both the image forming apparatus 100 and the air cleaner 71 can be recognized using the display unit 133 of the air cleaner 71.

As described above, in the image forming apparatus 100, when in the night mode, only the facsimile communication unit 115, the input/output unit 119, and some of the functions of the control unit 111 are allowed to remain operating. Also, when in the standby mode, the power saving mode, the warm-up mode, or the print processing mode, at least the facsimile communication unit 115, the input/output unit 119, and some of the functions of the control unit 111 are allowed to remain operating. Therefore, it can be said that the facsimile communication unit 115, the input/output unit 119, and some of the functions of the control unit 111 are allowed to remain operating all the time.

Further, in the air cleaner 71, even if the air cleaning operation is stopped when in the night mode, the input/output unit 134, the display unit 133, and some of the functions of the control unit 131 are allowed to remain operating. Of course, the input/output unit 134, the display unit 133, and the control unit 131 are also allowed to remain operating during the air cleaning operation. Therefore, it can be said that the input/output unit 134, the display unit 133, and some of the functions of the control unit 131 are allowed to remain operating all the time.

Accordingly, the control unit 111 of the image forming apparatus 100 can perform data communication with the control unit 131 of the air cleaner 71 when in any of the warm-up mode, the print processing mode, the standby mode, the power saving mode, and the night mode, and thus the control unit 111 can notify the control unit 131 of the air cleaner 71 of the operating state of the image forming apparatus 100. Then, the control unit 131 of the air cleaner 71 can display the operating state of the image forming apparatus 100 with the display unit 133.

FIG. 8 shows an example of the disposition of LEDs of the display unit 133. As shown in FIG. 8, three LEDs 133*a*, 133*b* and 133*c* serving as the display unit 133 are disposed on the front panel of the main body of the air cleaner 71. The LED 133*a* emits green light, the LED 133*b* emits blue light, and the LED 133*c* emits orange light. The control unit 131 of the air cleaner 71 selectively flashes or illuminates the LEDs 133*a* to 133*c*, thereby reporting various information using the respective LEDs 133*a* to 133*c*.

FIG. 9 is a chart showing respective report information corresponding to flashing or illumination of the LEDs 133*a* to 133*c*. The control unit 111 of the image forming apparatus 100 and the control unit 131 of the air cleaner 71 hold a data table corresponding to the chart in FIG. 9, and control the LEDs 133*a* to 133*c* by referring to this data table. Note that the control unit 111 of the image forming apparatus 100 may hold only the content of the data table with regard to the two LEDs 133*a* and 133*c* for reporting the state of the image forming apparatus 100, and the control unit 131 of the air cleaner 71 may hold only the content of the data table with regard to the one LED 133*b* for reporting the state of the air cleaner 71. Alternatively, either the control unit 111 of the image forming apparatus 100 or the control unit 131 of the air cleaner 71 may hold the data table corresponding to the chart in FIG. 9, and may control the LEDs in cooperation with the other control unit.

As shown in the chart in FIG. 9, the LED 133*a* that emits green light is for displaying the state of facsimile communication or print processing of the image forming apparatus 100. If the first display pattern is set as content of the data table corresponding to item e in Table 1 above, the green LED 133*a* is used to report the state of facsimile communication, and if the second display pattern is set as content of the data table corresponding to item e in Table 1, the green LED 133*a* is used to report the state of print processing. Specifically, the first display pattern is a pattern in which the LED 133*a* is flashed when receiving facsimile communication, and the LED 133*a* is illuminated when reception of facsimile communication is complete. Further, the second display pattern is a pattern in which the LED 133*a* is flashed when performing print processing, and the LED 133*a* is illuminated when print processing is complete.

The control unit 111 of the image forming apparatus 100 checks which of the first or second display pattern is set, by referring to the content of the data table corresponding to item e in Table 1, in order to display the state of the image forming apparatus 100 with the display unit 133 of the air cleaner 71, when in any of the warm-up mode, the print processing mode, the standby mode, the power saving mode, and the night mode. Then, if the first display pattern is set, the control unit 111 obtains the first display pattern of the LED 133*a* for reporting the state of facsimile communication by referring to the data table corresponding to the chart in FIG. 9, monitors the facsimile communication unit 115, and notifies the air cleaner 71 of an instruction to flash the LED 133*a* of the display unit 133 via the input/output unit 119 in order to flash the LED 133*a* in accordance with the first display pattern when the facsimile communication unit 115 enters a receiving state. The control unit 131 of the air cleaner 71 receives the instruction to flash the LED 133*a* via the input/output unit 134, and flashes the LED 133*a* of the display unit 133. After that, when reception performed by the facsimile communication unit 115 is complete, the control unit 111 of the image forming apparatus 100 notifies the air cleaner 71 of an instruction to illuminate the LED 133*a* of the display unit 133 via the input/output unit 119 in order to illuminate the LED 133*a* in accordance with the first display pattern. The control unit 131 of the air cleaner 71 receives the instruction to illuminate the LED 133*a* via the input/output unit 134, and illuminates the LED 133*a* of the display unit 133.

Further, when the second display pattern is set, the control unit 111 of the image forming apparatus 100 obtains the second display pattern of the LED 133*a* for reporting the state of print processing by referring to the data table corresponding to the chart in FIG. 9, monitors the image forming unit 114, and notifies the air cleaner 71 of an instruction to flash the LED 133*a* of the display unit 133 in order to flash the LED 133*a* in accordance with the second display pattern when the image forming unit 114 enters the print processing state. The control unit 131 of the air cleaner 71 receives the instruction to flash the LED 133*a*, and flashes the LED 133*a* of the display unit 133. After that, when the print processing performed by the image forming unit 114 is complete, the control unit 111 of the image forming apparatus 100 notifies the air cleaner 71 of an instruction to illuminate the LED 133*a* of the display unit 133 in order to illuminate the LED 133*a* in accordance with the second display pattern. The control unit 131 of the air cleaner 71 receives the instruction to illuminate the LED 133*a*, and illuminates the LED 133*a* of the display unit 133.

Therefore, if either the first or second display pattern is selected in the selection box 177 in the input setting screen 171 shown in FIG. 6A, according to the selected display pattern, the state of facsimile communication or print processing of the image forming apparatus 100 is displayed by flashing or illuminating the LED 133*a* of the display unit 133 of the air cleaner 71.

Further, when the image forming apparatus 100 is set to either the standby mode, the power saving mode, or the night mode, although the display unit 116 is stopped, the state of facsimile communication or print processing of the image forming apparatus 100 is displayed by the display unit 133 of the air cleaner 71, instead of the display unit 116, and thus the display of these states will not be interrupted.

Further, as shown in the chart in FIG. 9, the LED 133*b* that emits blue light is for showing the operating state of the air cleaner 71. When the blue LED 133*b* is flashed, the air cleaner 71 is in a failed state or the air cleaner 71 is in a state where maintenance is necessary, and when the blue LED 133*b* is illuminated, the air cleaner 71 is in an air cleaning operation state.

The control unit 131 of the air cleaner 71 determines failure of the air cleaner 71 based on the detection output from a sensor (not shown) in the air cleaner 71, and if it is determined that the air cleaner 71 has failed, the control unit 131 obtains the display pattern of the LED 133*b* for reporting failure of the air cleaner 71 by referring to the data table corresponding to the chart in FIG. 9, and flashes the LED 133*b*. Alternatively, the control unit 131 accumulatively measures a driving time period of the motor 132 of the fan 82*c* and the ion generating elements 85, and determines whether or not maintenance is necessary based on this driving time period, and if this driving time period reaches a prescribed time period set in advance, the control unit 131 refers to the data table corresponding to the chart in FIG. 9, and flashes the LED 133*b*. Further, if the control unit 131 determines that the air cleaner 71 is in the air cleaning operation state while driving the motor 132 of the fan 82*c* and the ion generating elements 85, the control unit 131 refers to the data table corresponding to the chart in FIG. 9, and illuminates the LED 133*b*.

Therefore, the state of the air cleaner 71 is displayed by flashing or illuminating the LED 133*b* of the display unit 133 of the air cleaner 71.

Moreover, as is clear from the chart in FIG. 9, the LED 133*c* that emits orange light is for showing the operating state of the image forming apparatus 100. If the orange LED 133*c* is flashed, the image forming apparatus 100 is in a failed state, and if the orange LED 133*c* is illuminated, the image forming apparatus 100 is in a paper jam state or the image forming apparatus 100 is in a state where maintenance is necessary.

The control unit 111 of the image forming apparatus 100 determines whether or not failure of the image forming apparatus 100, a paper jam, or the necessity for maintenance has occurred based on the detection output from a sensor (not shown) in the image forming apparatus 100 or stores the determination results, when in any of the warm-up mode, the print processing mode, the standby mode, the power saving mode, and the night mode. If the control unit 111 determines that the image forming apparatus 100 has failed, or the stored determination result indicates its failure, the control unit 111 obtains the display pattern of the LED 133*c* for reporting failure of the image forming apparatus 100 by referring to the data table corresponding to the chart in FIG. 9, and notifies the air cleaner 71 of an instruction to flash the LED 133*c*. The control unit 131 of the air cleaner 71 receives the instruction to flash the LED 133*c*, and flashes the LED 133*c* of the display unit 133. Further, if the control unit 111 determines the paper jam state of the image forming apparatus 100 or the necessity for maintenance, or if the stored determination result indicates the paper jam state or the necessity for maintenance, the control unit 111 refers to the data table corresponding to the chart in FIG. 9, and notifies the air cleaner 71 of an instruction to illuminate the LED 133*c*. The control unit 131 of the air cleaner 71 receives the instruction to illuminate the LED 133*c*, and illuminates the LED 133*c* of the display unit 133.

Consequently, failure of the image forming apparatus 100, a paper jam, and the necessity for maintenance are displayed by flashing or illuminating the LED 133*c* of the display unit 133 of the air cleaner 71.

Further, when the image forming apparatus 100 is set to either the standby mode, the power saving mode, or the night mode, although the display unit 116 is stopped, failure of the image forming apparatus 100, a paper jam, and the necessity for maintenance are displayed by the display unit 133 of the air cleaner 71, instead of the display unit 116, and thus the display thereof will not be interrupted.

As described above, in Embodiment 1 of the present invention, the display unit 133 of the air cleaner 71 that is disposed at a high position displays the state of facsimile communication or print processing of the image forming apparatus 100, and displays failure of the image forming apparatus 100, a paper jam, the necessity for maintenance, and the like. Thereby, the operating states of both the image forming apparatus 100 and the air cleaner 71 can be recognized by looking at the display unit 133 of the air cleaner 71 from a distance. Thus, it will be easy to manage both of the apparatuses.

Further, when the image forming apparatuses 100 is either in the standby mode, the power saving mode, or the night mode, even if the display unit 116 of the image forming apparatus 100 is stopped for reducing power consumption, since the operating state of the image forming apparatus 100 is displayed by the display unit 133 of the air cleaner 71, the display of the operating state of the image forming apparatus 100 will not be interrupted.

Embodiment 2

The basic configuration of an image forming system according to Embodiment 2 of the present invention is similar to the basic configuration of the image forming system according to Embodiment 1 described above. Accordingly, configuration that is the same as the image forming system according to Embodiment 1 is given the same numeral, and the description thereof is appropriately omitted, and thus only configuration that differs from the image forming system according to Embodiment 1 is described below.

In the image forming system according to Embodiment 2, display patterns for display performed by the display unit 133 of the air cleaner 71 differ from those in the image forming system according to Embodiment 1. Specifically, in the image forming system according to Embodiment 2, it is possible to select first, second, and third display patterns in the selection box 177 that is displayed in the input setting screen shown in FIG. 6A by the touch panel of the input operation unit 117 being operated.

Table 2 shows, in an organized manner, coordinated operation of the image forming apparatus 100 and the air cleaner 71 and display patterns for display performed by the display unit 133 of the air cleaner 71, which are set in the image forming system according to Embodiment 2. In Embodiment 2, the control unit 111 of the image forming apparatus 100 stores item a or b, item c or d, and item e in Table 2 as a data table, and uses this data table for controlling the air cleaner 71.

TABLE 2

| | Coordinated operation determination | Operation of air cleaner | Actual operation |
|---|---|---|---|
| a | Coordinate with power key of image forming apparatus being turned on | Turn on<br>Set air volume to high or low | Start air cleaning operation in coordination with transition from night mode to warm-up mode |
| b | Do not coordinate with power key of image forming apparatus being turned on | Do not switch operation | Do not switch operation of air cleaner |
| c | Coordinate with power key of image forming apparatus being turned off | Turn off<br>Turn timer on or off<br>Arbitrary prescribed time period | Stop air cleaning operation in coordination with night mode being set |
| d | Do not coordinate with power key of image forming apparatus being turned off | Do not switch operation | Do not switch operation of air cleaner |
| e | Select display pattern<br>First, second, or third display pattern | | |

Next is a description of a control procedure for the control unit 111 of the image forming apparatus 100 controlling the air cleaner 71 when the night mode is set.

During the daytime, the power key 123 of the image forming apparatus 100 is on, and the image forming apparatus 100 is set to either the print processing mode, the standby mode, or the power saving mode.

The control unit 111 stands by until the power key 123 of the image forming apparatus 100 is turned off at night, and when the power key 123 is turned off, the control unit 111 sets the image forming apparatus 100 to the night mode. When the image forming apparatus 100 is in the night mode, the power supply from the main power source 121 to the units involved with print processing is stopped, the power supply from the main power source 121 to the input/output unit 119 and the control unit 111 is continued, and the sub power source 122 is kept on so as to continue the power supply from the sub power source 122 to the facsimile communication unit 115.

At this time, the control unit 111 checks which of "coordinate with power key being turned off" or "do not coordinate with power key being turned off" is set, by referring to the content of the data table corresponding to item c or d in Table 2, and continues the operation of the air cleaner 71 if "do not coordinate with power key being turned off" in item d is set.

Further, if "coordinate with power key being turned off" in item c is set, the control unit 111 checks which of "timer on" or "timer off" is set, by referring to the content of the data table corresponding to item c, and immediately stops the air cleaning operation of the air cleaner 71 if "timer off" is set. The air cleaning operation of the air cleaner 71 being stopped means that the motor 132 and the ion generating elements 85 are stopped, and the operation of the input/output unit 134, the display unit 133, and some of the functions of the control unit 131 is continued.

Further, if "timer on" is set, the control unit 111 obtains a prescribed time period to be measured by the timer by referring to the content of the data table corresponding to item c, and starts measuring the prescribed time period with the timer. Then, when the timer finishes measuring the prescribed time period, that is, when the prescribed time period has elapsed since the point in time when the power key 123 of the image forming apparatus 100 is turned off, the control unit 111 stops the air cleaning operation of the air cleaner 71.

Thus, when the power key 123 is turned off at night, the image forming apparatus 100 is set to the night mode, and the air cleaning operation of the air cleaner 71 is continued or stopped. After that, when the power key 123 is turned on in the morning, the image forming apparatus 100 transitions from the night mode to the warm-up mode. At this time, the control unit 111 checks which of "coordinate with power key being turned on" or "do not coordinate with power key being turned on" is set, by referring to the content of the data table corresponding to item a or b in Table 2. For example, if "do not coordinate with power key being turned on" in item b is set, although the control unit 111 sets the image forming apparatus 100 to the warm-up mode in response to the power key 123 of the image forming apparatus 100 being turned on, the control unit 111 does not restart the air cleaning operation of the air cleaner 71. It should be noted that if the air cleaner 71 is performing the air cleaning operation when the image forming apparatus 100 is in the night mode, this air cleaning operation is continued.

Further, if "coordinate with power key being turned on" in item a is set, the control unit 111 sets the image forming apparatus 100 to the warm-up mode in response to the power key 123 of the image forming apparatus 100 being turned on, and also restarts the air cleaning operation of the air cleaner 71. Further, if the air cleaner 71 is performing the air cleaning operation when the image forming apparatus 100 is in the night mode, this air cleaning operation is continued.

Moreover, the control unit 111 checks the setting of the air volume of the air cleaner 71 by referring to the content of the data table corresponding to item a when restarting the air cleaning operation of the air cleaner 71, and if the air volume is set to "high", the control unit 111 drives the fan 82*c* to rotate at a high speed by increasing the rotational speed of the motor 132, thus increasing the air volume of the air cleaner 71. Further, if the air volume is set to "low", the control unit 111 drives the fan 82*c* to rotate at a low speed by decreasing the rotational speed of the motor 132, thus reducing the air volume of the air cleaner 71.

Since the air cleaning operation of the air cleaner 71 is thus stopped or restarted according to the image forming apparatus 100 being set to the night mode and transitioning from the night mode to the warm-up mode, the power consumption of the air cleaner 71 can be reduced without needing to particularly operate the air cleaner 71, and without impairing the effect of the air cleaner 71 at all.

Note that although the air cleaning operation of the air cleaner 71 is turned on/off in response to the power key 123 of the image forming apparatus 100 being turned on/off, that is, in response to the key operation performed by the user, the air cleaner 71 can also be coordinated following the above procedure in the case where the night mode is set automatically and a transition is made from the night mode to the warm-up mode based on a time schedule that has been set in advance in the image forming apparatus 100.

Next is a description of a control procedure for causing the display unit 133 of the air cleaner 71 to display the state of the image forming apparatus 100.

In the image forming apparatus 100, the display unit 116 is allowed to remain operating when the warm-up mode, the print processing mode, the standby mode, or the power saving mode is set. However, reduction of power consumption is achieved by stopping the display unit 116 when the night mode is set.

Further, in the image forming apparatus 100, although only the facsimile communication unit 115, the input/output unit 119, and some of the functions of the control unit 111 are allowed to remain operating when in the night mode, at least the facsimile communication unit 115, the input/output unit 119, and some of the functions of the control unit 111 are also allowed to remain operating when in the warm-up mode, the print processing mode, the standby mode, or the power saving mode.

Moreover, in the air cleaner 71, even if the air cleaning operation is stopped when in the night mode, unless the power switch 136 is turned off, the input/output unit 134, the display unit 133, and some of the functions of the control unit 131 are allowed to remain operating. Therefore, it can be said that the input/output unit 134, the display unit 133, and some of the functions of the control unit 131 are allowed to remain operating all the time.

Accordingly, the control unit 111 of the image forming apparatus 100 can perform data communication with the control unit 131 of the air cleaner 71 when in any of the warm-up mode, the print processing mode, the standby mode, the power saving mode, and the night mode, and thus the control unit 111 can notify the control unit 131 of the air cleaner 71 of the state of the image forming apparatus 100. Then, the control unit 131 of the air cleaner 71 can display the state of the image forming apparatus 100 with the display unit 133.

FIG. 10 shows an example of the disposition of LEDs of the display unit 133. As shown in FIG. 10, LEDs 133*d*, 133*e*, and 133*f* and LEDs 133-1, 133-2, and 133-3 that serve as the display unit 133 are disposed on the front panel of the main body of the air cleaner 71. The LED 133*d* emits green light, the LED 133*e* emits blue light, and the LED 133*f* emits red light. Further, all of the LEDs 133-1, 133-2, and 133-3 emit white light. The control unit 131 of the air cleaner 71 selectively illuminates or flashes the LEDs 133*d* to 133*f*, and 133-1 to 133-3, and reports various information with the LEDs.

FIG. 11 is a chart showing respective report information corresponding to flashing or illumination of the LEDs 133*d* to

133*f* and 133-1 to 133-3. The control unit 111 of the image forming apparatus 100 and the control unit 131 of the air cleaner 71 hold a data table corresponding to the chart in FIG. 11 in a storage unit, and control the LEDs 133*d* to 133*f* and 133-1 to 133-3 by referring to this data table. Note that the control unit 111 of the image forming apparatus 100 may hold only the content of the data table with regard to the five LEDs 133*d*, 133*f*, and 133-1 to 133-3, for reporting the state of the image forming apparatus 100, and the control unit 131 of the air cleaner 71 may hold only the content of the data table with regard to the one LED 133*e* for reporting the state of the air cleaner 71. Alternatively, either the control unit 111 of the image forming apparatus 100 or the control unit 131 of the air cleaner 71 may hold the data table corresponding to the chart in FIG. 11, and may control the LEDs in cooperation with the other control unit.

As shown in the chart in FIG. 11, the LED 133*d* that emits green light is for displaying the state of the image forming apparatus 100, and if the first display pattern is set as content of the data table corresponding to item e in Table 2 above, the green LED 133*d* and the LED 133-1 are used to report a printing execution state and a scanner execution state, and if the second display pattern is set as content of the data table corresponding to item e in Table 2, the green LED 133*d* and the LED 133-1 are used to report the state of the standby mode or the power saving mode, and the state of the print processing mode. Moreover, if the third display pattern is set as content of the data table corresponding to item e in Table 2, the green LED 133*d* and the LED 133-3 are used to report the state of facsimile reception.

Specifically, the first display pattern is a pattern in which illumination of the LED 133-1 indicates that the image forming apparatus 100 is either in the printing execution state or the scanner execution state, the LED 133*d* is illuminated when in the printing execution state, and the LED 133*d* is flashed when in the scanner execution state. Further, the second display pattern is a pattern in which illumination of the LED 133-2 indicates that the image forming apparatus 100 is either in the state of the standby mode or the power saving mode or the state of the print processing mode, the LED 133*d* is illuminated when in the state of the standby mode or the power saving mode, and the LED 133*d* is flashed when in the state of the print processing mode. Moreover, the third display pattern is a pattern in which illumination of the LED 133-3 indicates that the image forming apparatus 100 is in the state of facsimile reception, the LED 133*d* is illuminated while waiting for facsimile reception, and the LED 133*d* is flashed when facsimile reception is started.

The control unit 111 of the image forming apparatus 100 checks which of the first, second, or third display pattern is set, by referring to the content of the data table corresponding to item e in Table 2, in order to cause the display unit 133 of the air cleaner 71 to display the state of the image forming apparatus 100. Then, if the first display pattern is set, the control unit 111 obtains the first display pattern for reporting that the image forming apparatus 100 is either in the printing execution state or the scanner execution state by referring to the data table corresponding to the chart in FIG. 11, and notifies the air cleaner 71 of an instruction to illuminate the LED 133-1 via the input/output unit 119 in order to illuminate the LED 133-1 in accordance with the first display pattern. The control unit 131 of the air cleaner 71 receives the instruction to illuminate the LED 133-1 via the input/output unit 134, and illuminates the LED 133-1 of the display unit 133. Then, the control unit 111 monitors the image forming unit 114 and the original reading apparatus 101, and notifies the air cleaner 71 of an instruction to illuminate the LED 133*d* of the display unit 133 via the input/output unit 119 in order to illuminate the LED 133*d* in accordance with the first display pattern when the image forming apparatus 100 enters the printing execution state where the image forming unit 114 performs printing. The control unit 131 of the air cleaner 71 receives the instruction to illuminate the LED 133*d* via the input/output unit 134, and illuminates the LED 133*d* of the display unit 133. Alternatively, the control unit 111 gives an instruction to flash the LED 133*d* of the display unit 133 to the air cleaner 71 in order to flash the LED 133*d* in accordance with the first display pattern when the image forming apparatus 100 enters the scanner execution state where the original reading apparatus 101 performs scanning. Upon receipt of the instruction to flash the LED 133*d*, the control unit 131 of the air cleaner 71 flashes the LED 133*d* of the display unit 133.

Further, if the second display pattern is set in the data table corresponding to item e in Table 2, the control unit 111 of the image forming apparatus 100 obtains the second display pattern for reporting that the image forming apparatus 100 is either in the state of the standby mode or the power saving mode, or the state of the print processing mode, by referring to the data table corresponding to the chart in FIG. 11, and notifies the air cleaner 71 of an instruction to illuminate the LED 133-2 in order to illuminate the LED 133-2 in accordance with the second display pattern. The control unit 131 of the air cleaner 71 illuminates the LED 133-2 of the display unit 133 upon receipt of the instruction to illuminate the LED 133-2. Then, the control unit 111 gives an instruction to illuminate the LED 133*d* of the display unit 133 to the air cleaner 71 in order to illuminate the LED 133*d* in accordance with the second display pattern when the image forming apparatus 100 is set to be in the state of the standby mode or the power saving mode. The control unit 131 of the air cleaner 71 illuminates the LED 133*d* of the display unit 133 upon receipt of the instruction to illuminate the LED 133*d*. Alternatively, the control unit 111 gives an instruction to flash the LED 133*d* of the display unit 133 to the air cleaner 71 in order to flash the LED 133*d* in accordance with the second display pattern when the image forming apparatus 100 is set to be in the state of the print processing mode. The control unit 131 of the air cleaner 71 flashes the LED 133*d* of the display unit 133 upon receipt of the instruction to flash the LED 133*d*.

Moreover, if the third display pattern is set in the data table corresponding to item e in Table 2, the control unit 111 of the image forming apparatus 100 obtains the third display pattern for reporting that the image forming apparatus 100 is in the state of facsimile reception, by referring to the data table corresponding to the chart in FIG. 11, and notifies the air cleaner 71 of an instruction to illuminate the LED 133-3 in order to illuminate the LED 133-3 in accordance with this third display pattern. In response to this, the control unit 131 of the air cleaner 71 illuminates the LED 133-3 of the display unit 133. Then, the control unit 111 monitors the facsimile communication unit 115, and gives an instruction to illuminate the LED 133*d* of the display unit 133 to the air cleaner 71 in order to illuminate the LED 133*d* in accordance with the third display pattern while waiting for facsimile reception that is performed by the facsimile communication unit 115. In response to this, the control unit 131 of the air cleaner 71 illuminates the LED 133*d* of the display unit 133. Further, the control unit 111 gives an instruction to flash the LED 133*d* of the display unit 133 to the air cleaner 71 in order to flash the LED 133*d* in accordance with the third display pattern when the image forming apparatus 100 enters the state of facsimile reception performed by the facsimile communication unit 115. In response to this, the control unit 131 of the air cleaner 71 flashes the LED 133*d* of the display unit 133.

Therefore, if either the first, second, or third display pattern is selected in the selection box 177 in the input setting screen 171 in FIG. 6A, the state of the image forming apparatus 100 is displayed according to the selected display pattern, by selectively illuminating the LEDs 133-1 to 133-3 of the display unit 133 of the air cleaner 71, and flashing or illuminating the LED 133*d* thereof. Note that when the image forming apparatus 100 is set to another mode other than the night mode, since the display unit 116 is not stopped, the state of the image forming apparatus 100 is also displayed on the display unit 116.

Next, as shown in the chart in FIG. 11, the LED 133*e* that emits blue light is for showing the state of the air cleaner 71. When the blue LED 133*e* is flashed, the air cleaner 71 is in a failed state or the air cleaner 71 is in a state where maintenance is necessary, and when the blue LED 133*e* is illuminated, the air cleaner 71 is in the air cleaning operation state.

The control unit 131 of the air cleaner 71 determines failure of the air cleaner 71 based on the detection output from the sensor (not shown) in the air cleaner 71, and if it is determined that the air cleaner 71 has failed, the control unit 131 obtains the display pattern of the LED 133*e* for reporting failure of the air cleaner 71 by referring to the data table corresponding to the chart in FIG. 11, and flashes the LED 133*e*. Alternatively, the control unit 131 accumulatively measures a driving time period of the motor 132 of the fan 82*c* and the ion generating elements 85, and determines whether or not maintenance is necessary based on this driving time period, and if this driving time period reaches a prescribed time period set in advance, the control unit 131 refers to the data table corresponding to the chart in FIG. 11, and flashes the LED 133*e*. Further, if the control unit 131 determines that the air cleaner 71 is in the air cleaning operation state while driving the motor 132 of the fan 82*c* and the ion generating elements 85, the control unit 131 refers to the data table corresponding to the chart in FIG. 11, and illuminates the LED 133*e*.

Therefore, the state of the air cleaner 71 is displayed by flashing or illuminating the LED 133*e* of the display unit 133 of the air cleaner 71.

Next, as is clear from the chart in FIG. 11, the LED 133*f* that emits red light is for showing the state of the image forming apparatus 100. Flashing of the red LED 133*f* indicates a state where some trouble has occurred although the image forming apparatus 100 can operate, and illumination of the red LED 133*f* indicates a state where trouble has occurred, with which the image forming apparatus 100 cannot operate. The trouble with which the image forming apparatus 100 can operate is a toner near end state, for example. Further, the trouble with which the image forming apparatus 100 cannot operate is a toner end or paper jam state, for example.

The control unit 111 of the image forming apparatus 100 determines trouble of the image forming apparatus 100 based on the detection output from the sensor (not shown) in the image forming apparatus 100, and if it is determined that trouble with which the image forming apparatus 100 can operate has occurred, the control unit 111 obtains the display pattern for display performed by the LED 133*f* for reporting trouble with which the image forming apparatus 100 can operate by referring to the data table corresponding to the chart in FIG. 11, and gives an instruction to flash the LED 133*f* to the air cleaner 71. The control unit 131 of the air cleaner 71 flashes the LED 133*f* of the display unit 133 upon receipt of the instruction to flash the LED 133*f*. Further, if it is determined that trouble with which the image forming apparatus 100 cannot operate has occurred, the control unit 111 refers to the data table corresponding to the chart in FIG. 11, and gives an instruction to illuminate the LED 133*f* to the air cleaner 71. In response to this, the control unit 131 of the air cleaner 71 illuminates the LED 133*f* of the display unit 133.

Therefore, trouble of the image forming apparatus 100, such as toner near end, toner end, or a paper jam is displayed by flashing or illuminating the LED 133*f* of the display unit 133 of the air cleaner 71. Note that since the display unit 116 is not stopped when the image forming apparatus 100 is set to another mode other than the night mode, the trouble of the image forming apparatus 100 is also displayed on the display unit 116.

In this way, in Embodiment 2 of the present invention, using the display unit 133 of the air cleaner 71 disposed at a high position, a function being executed by the image forming apparatus 100, such as printing, scanning, or facsimile reception, is displayed, and the standby mode, the power saving mode, the print processing mode, or the like set in the image forming apparatus 100 is displayed, and further, trouble of the image forming apparatus 100, such as toner near end, toner end, or a paper jam, is displayed, and thus the state of the image forming apparatus 100 can be checked by looking at the display unit 133 of the air cleaner 71 from a distance.

Further, since failure of the air cleaner 71 and the necessity for maintenance are also displayed by the display unit 133 of the air cleaner 71 at the same time, the user can be informed of the states of the image forming apparatus 100 and the air cleaner 71 by only looking at the display unit 133 of the air cleaner 71, and thus it will be easy to manage both of the apparatuses.

Note that the image forming apparatus according to Embodiment 2 has the same configuration as that of the image forming apparatus according to Embodiment 1 with regard to the points other than those described above, thereby achieving similar effects to those in Embodiment 1.

Although embodiments of the present invention are described in detail above, the present invention is not limited to the above embodiments, and the scope of the present invention also encompasses embodiments in which design modification and the like have been performed without departing from the gist of the present invention.

For example, the number of LEDs of the display unit 133 of the air cleaner 71 may be increased or decreased, and the number of types of information that are reported using the combinations of flashing, illuminating, and turning off the LEDs may be increased or decreased. Further, a liquid crystal display device or the like may be used rather than LEDs.

Figure 12:
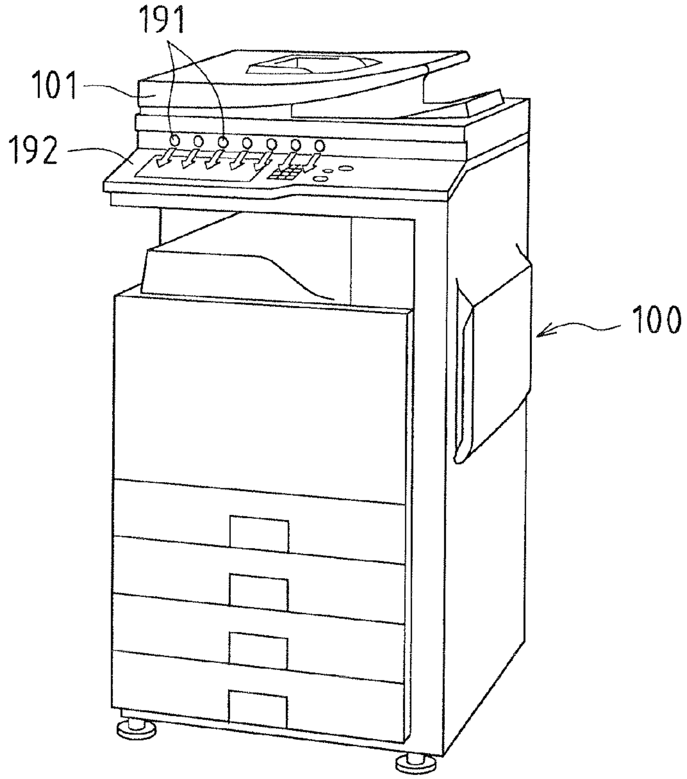
FIG. 12 is a perspective view showing another disposition mode of the air cleaner.

Further, in the above embodiments, although the air cleaner 71 is disposed above the image forming apparatus 100, the air cleaner 71 may be built into the image forming apparatus 100. Specifically, as shown in FIG. 12, a plurality of ventilation holes 191 are formed on the upper near side of the main body outer wall of the image forming apparatus 100, and the air cleaner 71 is provided on the inner side of the main body outer wall at the position of the ventilation holes 191, and ions may be blown out from the air cleaner 71 toward an operation panel 192 via the ventilation holes 191 on the main body outer wall.

Figure 13:
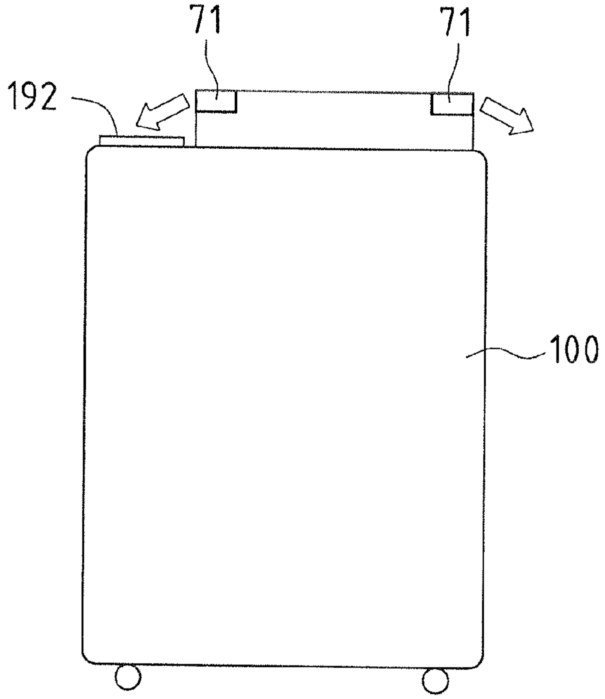
FIG. 13 is a lateral view showing a different disposition mode of the air cleaner.

Further, as shown in FIG. 13, an air cleaner 71 for blowing ions onto the operation panel 192 of the image forming apparatus 100, and an air cleaner 71 for blowing out ions around where the exhaust gas of the image forming apparatus 100 is produced may be independently provided.

The present invention may be embodied in various other forms without departing from the spirit or essential characteristics thereof. The embodiments disclosed herein to be considered in all respects as illustrative and not limiting. The scope of the invention is indicated by the appended claims rather than by the foregoing description, and all modifications or changes that come within the meaning and range of equivalency of the claims are intended to be embraced therein.

What is claimed is:

1. An image forming system, comprising:

an air cleaner for cleaning air;

an image forming apparatus that is settable to a mode for economizing power other than a warm-up mode and a print processing mode; and a control unit that causes a display unit of the air cleaner to display an operating state of the image forming apparatus when the image forming apparatus is set to the mode for economizing power, and that causes a display unit of the image forming apparatus to display the operating state of the image forming apparatus when the image forming apparatus is set to a normal print processing mode.

2. The image forming system according to claim 1, wherein the image forming apparatus has a facsimile communication function, and when the image forming apparatus is performing facsimile communication in a state where the mode for economizing power is set, the control unit causes the display unit of the air cleaner to display a state of the facsimile communication.

3. The image forming system according to claim 2, wherein the air cleaner includes an ion generating portion.

4. The image forming system according to claim 2, wherein the air cleaner is provided above the image forming apparatus.

5. The image forming system according to claim 2, wherein the air cleaner is built into the image forming apparatus.

6. The image forming system according to claim 1, wherein the air cleaner includes an ion generating portion.

7. The image forming system according to claim 1, wherein the air cleaner is provided above the image forming apparatus.

8. The image forming system according to claim 1, wherein the air cleaner is built into the image forming apparatus.

* * * * *